United States Patent
Cho et al.

(10) Patent No.: US 10,500,958 B2
(45) Date of Patent: Dec. 10, 2019

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventors: Jaehoon Cho, Seoul (KR); Hyeongjin Im, Seoul (KR); Sungil Cho, Seoul (KR); Heejeong Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 15/718,884

(22) Filed: Sep. 28, 2017

(65) Prior Publication Data

US 2018/0304749 A1  Oct. 25, 2018

(30) Foreign Application Priority Data

Apr. 19, 2017  (KR) ........................ 10-2017-0050634

(51) Int. Cl.
*B60K 37/06* (2006.01)
*B60K 35/00* (2006.01)
*B60K 37/02* (2006.01)
*G09F 9/30* (2006.01)

(52) U.S. Cl.
CPC .............. *B60K 37/06* (2013.01); *B60K 35/00* (2013.01); *B60K 37/02* (2013.01); *G09F 9/301* (2013.01); *B60K 2370/151* (2019.05); *B60K 2370/1868* (2019.05); *B60K 2370/52* (2019.05); *B60K 2370/67* (2019.05); *B60K 2370/774* (2019.05)

(58) Field of Classification Search
CPC ........ B60K 37/06; B60K 35/00; B60K 37/02; B60K 2350/405; B60K 2350/925; B60K 2350/908; B60K 2350/352; B60K 2350/962; G09F 9/301
See application file for complete search history.

(56) References Cited

U.S. PATENT DOCUMENTS

| | | |
|---|---|---|
| 2016/0259365 A1 | 9/2016 | Wang et al. |
| 2017/0083047 A1 | 3/2017 | Hélot et al. |
| 2017/0349098 A1* | 12/2017 | Uhm ...................... B60K 28/02 |

FOREIGN PATENT DOCUMENTS

| | | |
|---|---|---|
| DE | 102014221092 | 4/2016 |
| DE | 102015011377 | 3/2017 |
| WO | WO2016093535 | 6/2016 |

OTHER PUBLICATIONS

European Extended Search Report in European Application No. 17203343.3, dated Jun. 27, 2018, 10 pages.

* cited by examiner

*Primary Examiner* — Anne M Antonucci
(74) *Attorney, Agent, or Firm* — Fish & Richardson P.C.

(57) ABSTRACT

Provided is a vehicle control device and a control method thereof. The vehicle control device provided in a vehicle includes a display unit, a sensing unit configured to sense information associated with the vehicle, and a processor configured to bend at least one part of the display unit based on the information associated with the vehicle.

19 Claims, 22 Drawing Sheets

(a)

(b)

(a)

(b)

(c)

(a)

(b)

(c)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0050634, filed on Apr. 19, 2017, the contents of which are incorporated by reference herein in their entirety.

BACKGROUND OF THE INVENTION

1. Field of the Invention

This present disclosure relates to a vehicle control device provided in a vehicle and a control method of the vehicle.

2. Background of the Invention

A vehicle is an apparatus capable of moving a user in the user-desired direction, and a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians. For example, the vehicle may include devices operating in a manner of directly emitting light using lamps, such as a head lamp emitting light to a front side to ensure a driver's view, a brake lamp turned on when slamming the brake on, turn signal lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

In addition, the development on an inside of vehicle is consistently performed to provide optimized indoor environment to a user while assisting a safe driving through a various change of inside of a vehicle.

SUMMARY OF THE INVENTION

An object of the present disclosure is to provide a vehicle control device and a vehicle provided with a bendable display.

Another object of the present disclosure is to provide a vehicle control device and a vehicle control method capable of bending the display at a maximized shape depending on conditions.

Still another object of the present disclosure is to provide a vehicle control device and a vehicle control method capable of bending the display at a maximized method.

The problems to be solved in the present invention may not be limited to the aforementioned, and other problems to be solved by the present invention will be obviously understood by a person skilled in the art based on the following description. In order to accomplish the foregoing tasks, a vehicle control device provided in a vehicle according to an embodiment of the present disclosure may include a display unit, a sensing unit configured to sense information related to the c\vehicle, and a processor configured to at least part of the display unit based on the sensed information related to the vehicle.

According to an embodiment, the vehicle control device may include a display unit, a sensing unit configured to sense information associated with the vehicle, and a processor configured to bend at least one part of the display unit based on the information associated with the vehicle.

According to an embodiment, the processor may bend at least one part of the display unit based on that the sensed information associated with the vehicle satisfies a condition connected to bend the display unit.

According to an embodiment, the processor may bend the display unit in different form according to types of the information associated with the vehicle.

According to an embodiment, the information associated with the vehicle may include at least one of information associated with driving of the vehicle, whether or not a fellow passenger is boarded next to a driver, and information associated with contents outputted to the display unit.

According to an embodiment, the processor may bend preset part of the display unit when a driving mode of the vehicle enters a preset driving mode.

According to an embodiment, the processor may output second information different from first information when a preset part of the display unit is bent in a state that the first information is outputted.

According to an embodiment, the processor may output images received through a camera disposed at a side of the vehicle to regions adjacent to the preset part when the preset part of the display unit is bent.

According to an embodiment, the processor may bend the display unit based on an angle between a vehicle and the sun.

According to an embodiment, the processor may determine whether or not a fellow passenger is boarded next to a driver through the sensing unit and to bend the display unit in different form according to the determination result.

According to an embodiment, the processor may bend the display unit in a first form when the fellow passenger is boarded, and to bend the display unit in a second form which is different from the first form when only a driver is boarded.

According to an embodiment, the processor may maintain the display unit flat when the fellow passenger is boarded next to the driver, and to bend at least one part of the display unit such that one region of the display unit disposed towards a fellow passenger's seat faces the driver when only the driver is boarded.

According to an embodiment, when a plurality of contents are outputted to the display unit, the processor may bend the display unit such that an apex of a region where the display unit is bent has a different position based on a type of the plurality of contents.

According to an embodiment, the processor may sense at least one eyes between the driver and the fellow passenger through the sensing unit, and to determine a bending degree of the display unit based on the sensed eyes.

According to an embodiment, when a first contents among the plurality of contents is a contents connected to bend the display unit and a second contents, which is different from the first contents, among the plurality of contents is a contents connected to maintain the display unit flat, the processor may bend only a portion of the display unit where the first contents is outputted.

According to an embodiment, the processor may output a first image received through a camera disposed to capture a left side of a vehicle to a first region of the display unit, and to output a second image, which is different from the first image, received through a camera disposed to capture aright side of a vehicle to a second region of the display unit.

According to an embodiment, when a turn signal is turned on in a state that the first and second images are outputted, the processor may bend one of the first and second regions of the display unit, based on a direction that the turn signal indicates.

According to an embodiment, the processor may output at least one graphic object that guides an apex of a region where the display unit I bent, based on a user request.

According to an embodiment, when a preset user input is applied in a state that the at least one graphic object is outputted, the processor may bend the display unit such that the position where the graphic object is outputted is the apex.

According to an embodiment, a vehicle may include the vehicle control device

According to an embodiment, a method of controlling a vehicle provided with a vehicle control device may include sensing information associated with the vehicle; and bending at least one part of the display unit based on the sensed information associated with the vehicle.

Moreover, the specific details of embodiments are included in the detailed description and drawings.

According to an embodiment of the present disclosure, there are one or more following effects.

First, the present disclosure may provide a vehicle and a vehicle control device capable of bending a display unit provided in a vehicle in an optimized manner.

Second, the present disclosure may provide a vehicle and a vehicle control device capable of bending the display unit in an optimized form according to the type (condition) of information associated with a vehicle.

Third, the present disclosure may provide a vehicle and a vehicle control device capable of bending the display unit in an optimized manner by a user's operation.

The effects of the present invention may not be limited to those effects, and other effects which have not been mentioned can be obviously understood by those skilled in the art from the appending claims.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
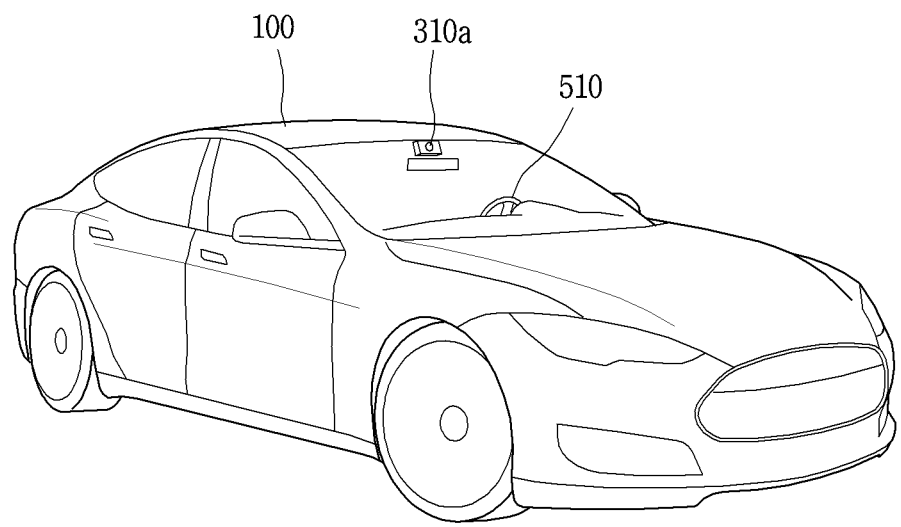
FIG. 1 is a view illustrating an appearance of a vehicle according to an embodiment of the present disclosure.
Figure 1:
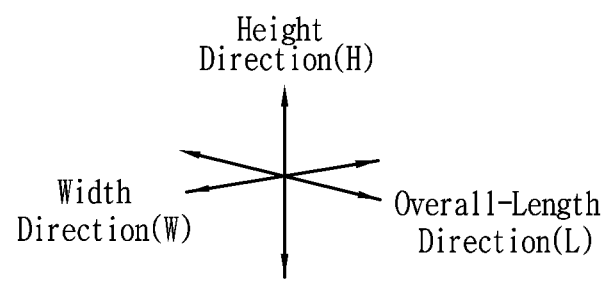

FIG. 1 is a view illustrating appearance of a vehicle in accordance with an embodiment of the present invention.

Figure 2:
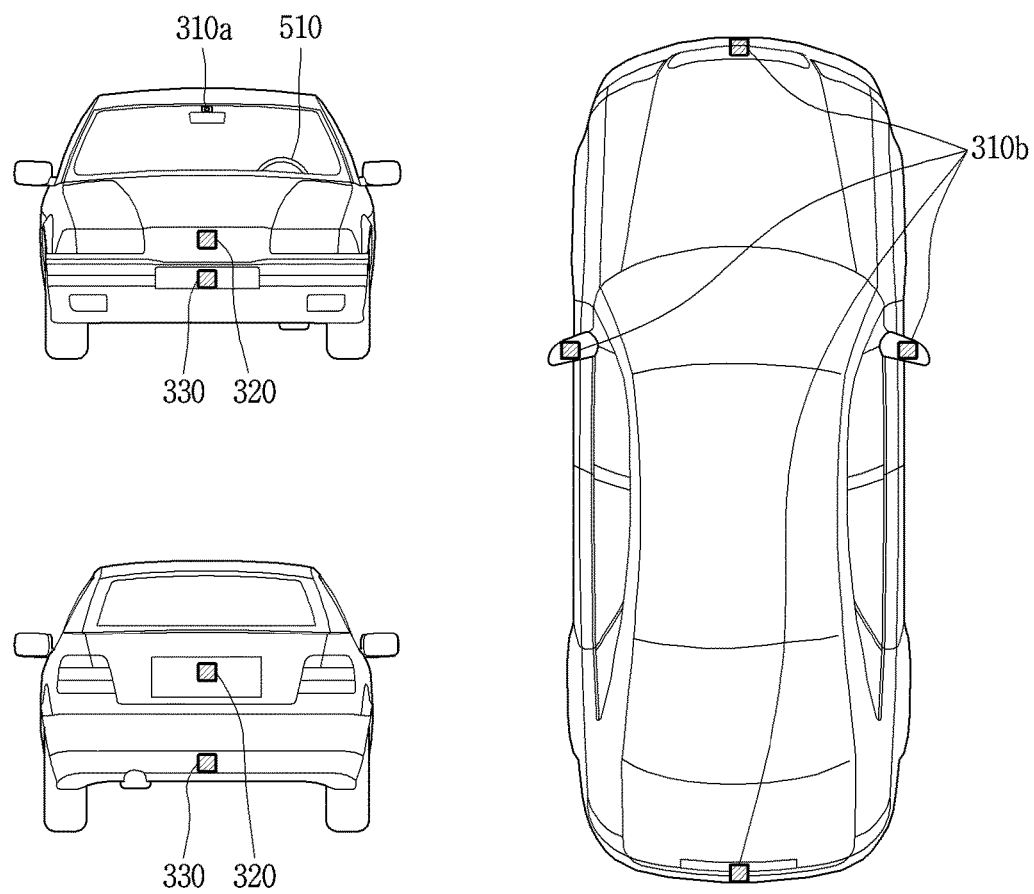
FIG. 2 is a view in which a vehicle according to an embodiment of the present disclosure is seen from various angles.

FIG. 2 is a view illustrating appearance of a vehicle at various angles in accordance with an embodiment of the present invention.

Figure 3:
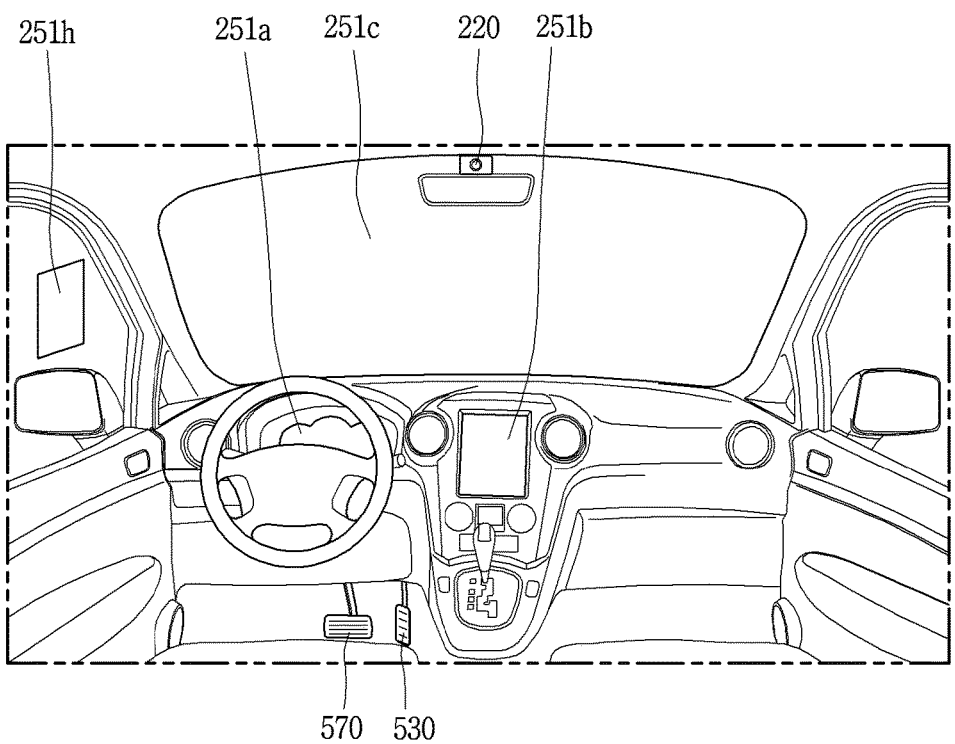
FIGS. 3 and 4 are views illustrating an inside of a vehicle according to an embodiment of the present disclosure.
Figure 4:
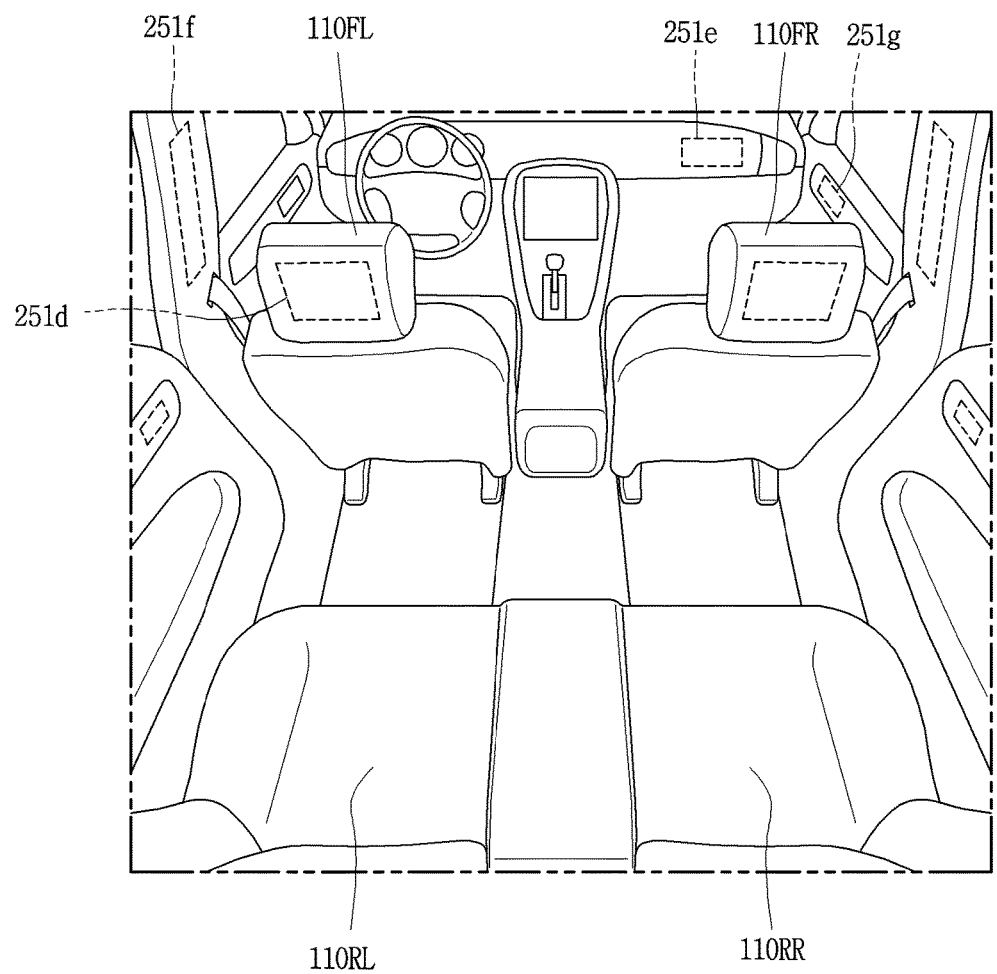

FIGS. 3 and 4 are views illustrating an inside of a vehicle in accordance with an embodiment of the present invention.

Figure 5:
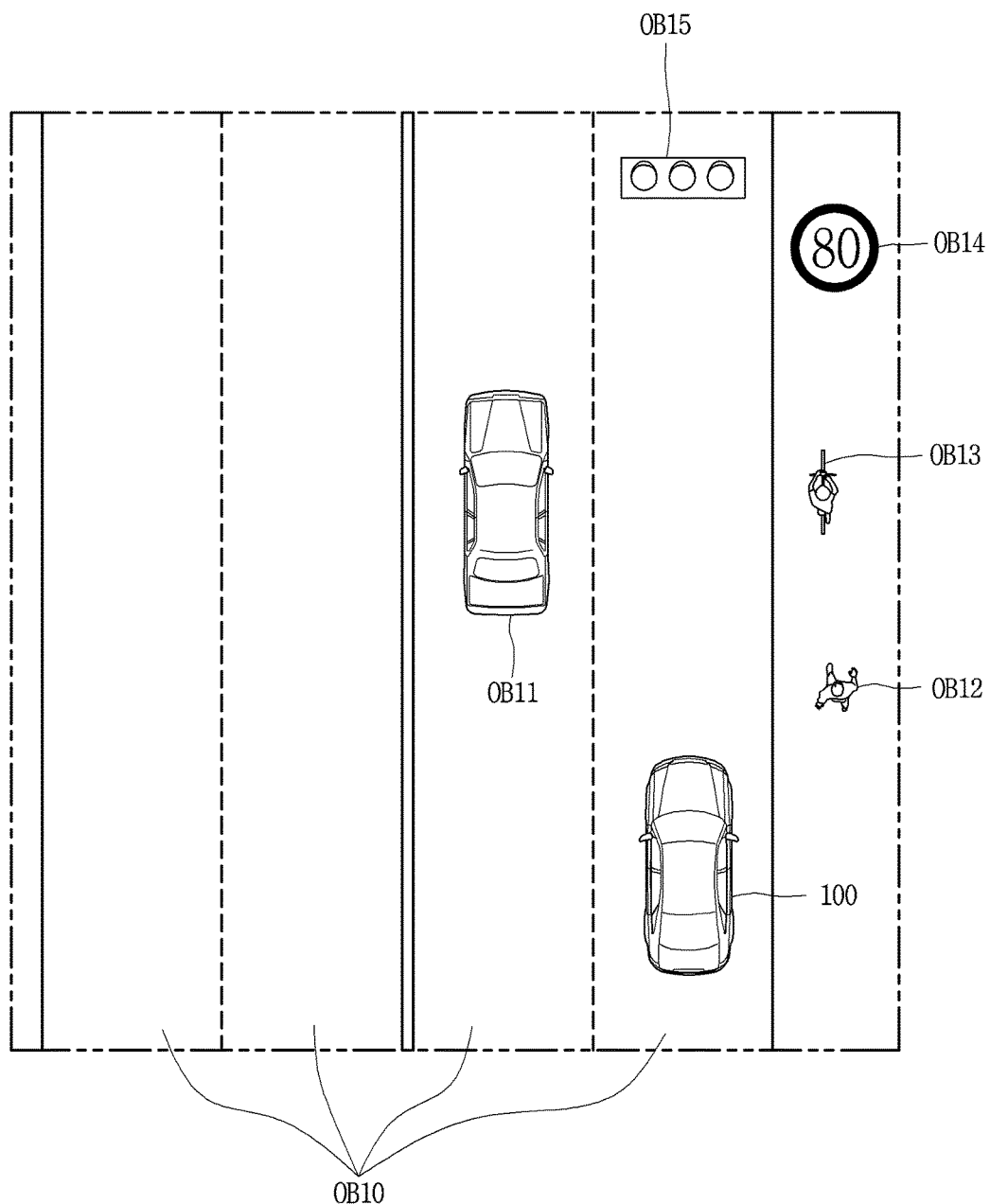
FIGS. 5 and 6 are views referred to explain an object according to an embodiment of the present disclosure.
Figure 6:
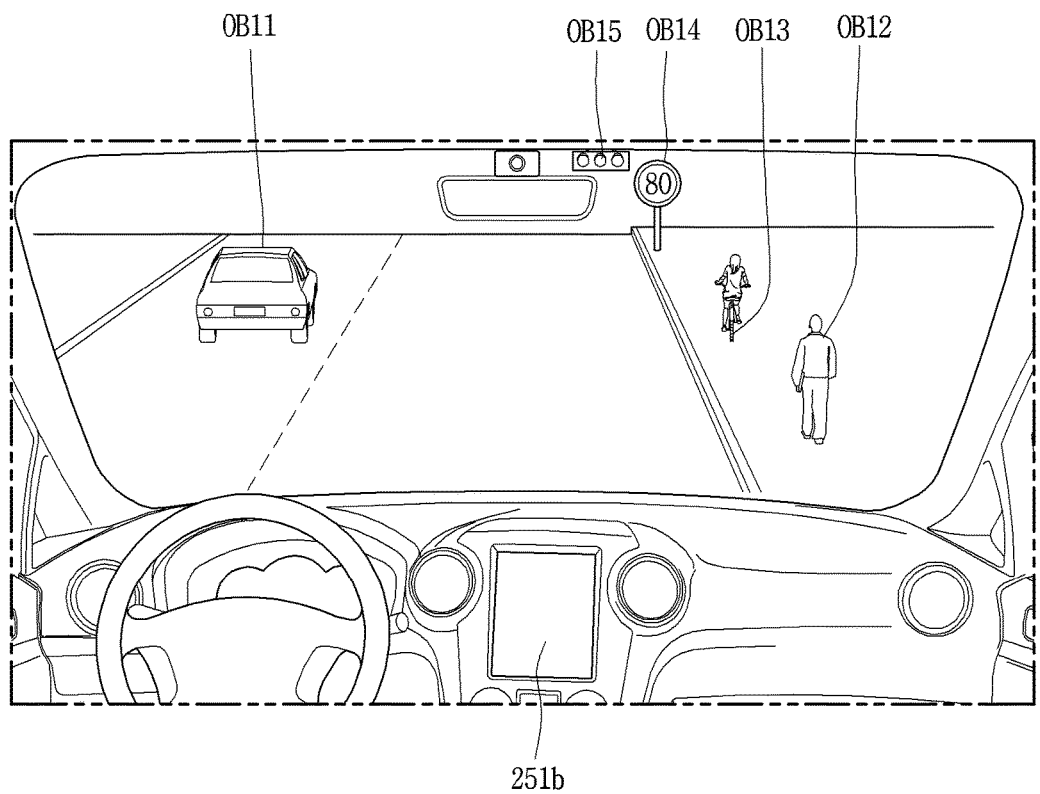

FIGS. 5 and 6 are reference views illustrating objects in accordance with an embodiment of the present invention.

Figure 7:
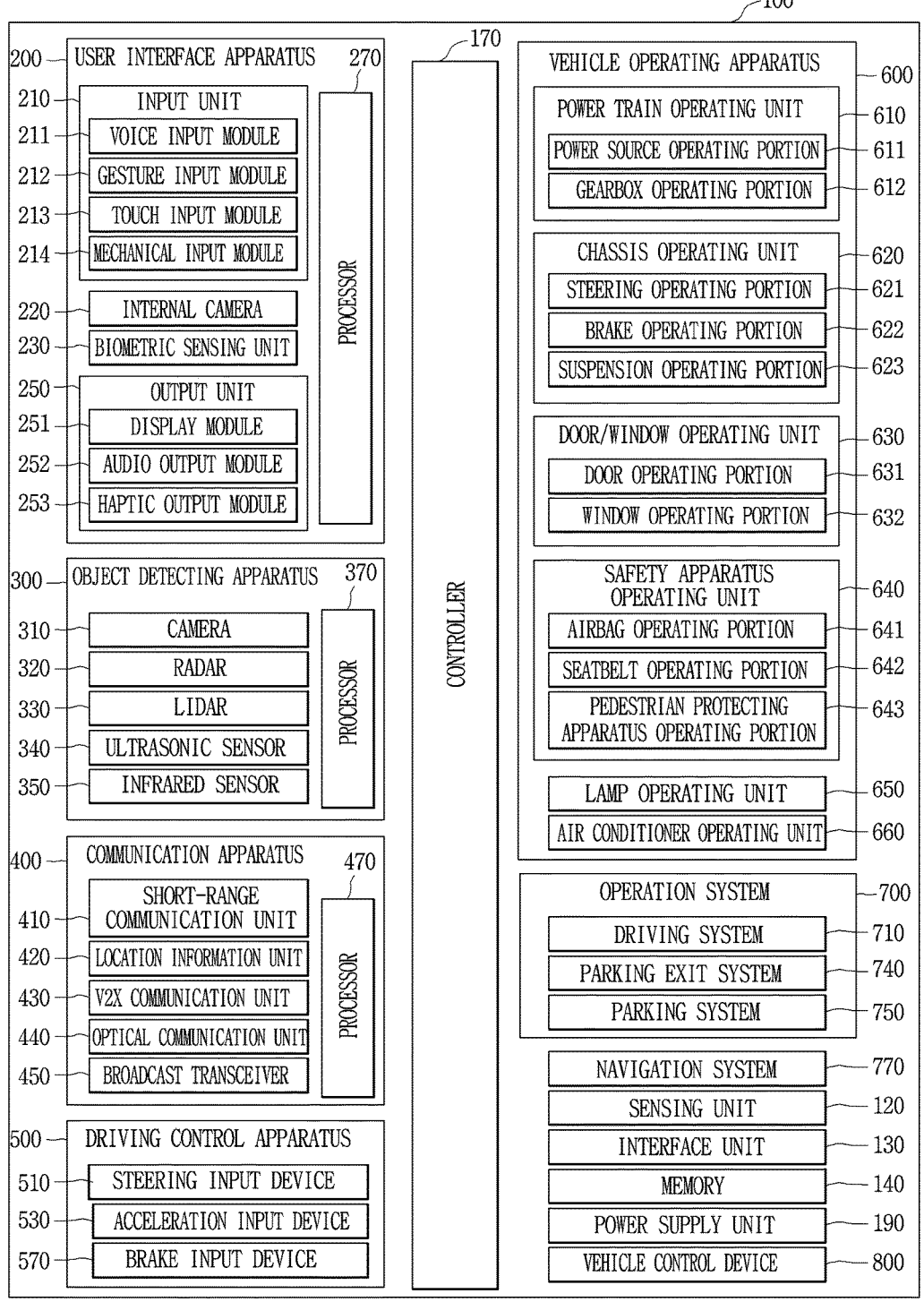
FIG. 7 is a block diagram for explaining a vehicle according to an embodiment of the present disclosure.

FIG. 7 is a block diagram illustrating a vehicle in accordance with an embodiment of the present invention As illustrated in FIG. 1 through 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251*a* through 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370. According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device. The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one embodiment of the present invention, with reference to the accompanying drawings.

Figure 8:
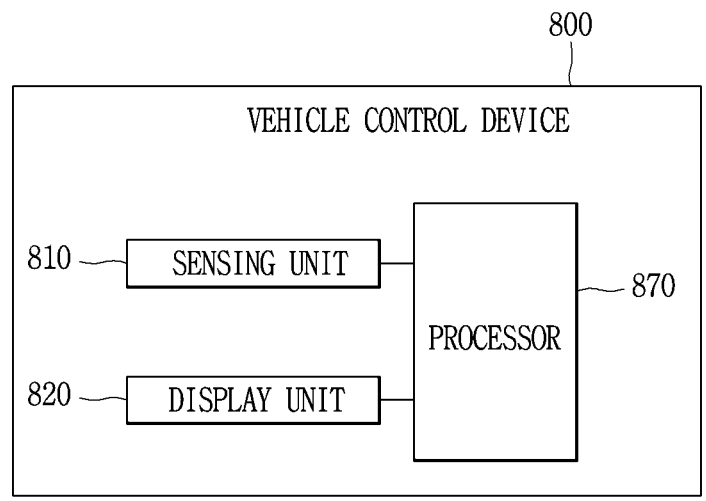
FIG. 8 is a conceptual view for explaining a vehicle control device according to an embodiment of the present disclosure.

FIG. 8 is a conceptual view for explaining the vehicle control device in accordance with one embodiment of the present disclosure.

The vehicle control device 800 associated with the present disclosure may include a sensing unit 810, a display unit 820, and a processor 870.

The vehicle control device 800 associated with the present disclosure may include the sensing unit 810.

The sensing unit 810 may be the object detecting apparatus 300 as described with reference to FIG. 7, or the sensing unit 120 provided in the vehicle 100.

Further, the sensing unit 810 may be the object detecting apparatus 300 provided in the vehicle 100, or a separate sensing unit which is independent from the sensing unit 120 provided in the vehicle 100. Even in a case where the sensing unit 810 is an independent sensing unit, the sensing unit 810 may include the characteristics of the sensing unit 120, as described in FIG. 7, or the object detecting apparatus 300.

The sensing unit 810 may include the camera 310 as described in FIG. 7.

Further, the sensing unit 810 may be embodied by a combination of at least two among the camera 310, the radar 320, the LiDAR 330, the ultrasonic sensor 340, the infrared sensor 350, the sensing unit 120, and the input unit 210 (or, the voice input unit 211).

The sensing unit 810 may sense an object around a vehicle 100 and information associated with the object.

For instance, the object may include neighboring vehicles, neighboring people, neighboring objects, and neighboring landform, as described before.

The sensing unit 810 may sense information associated with the vehicle 100 in accordance with the present disclosure.

The information associated with the vehicle may be at least one of the vehicle information (or, driving state of the vehicle) and neighboring information of the vehicle.

For instance, the vehicle information may include the driving speed of vehicle, the weight of vehicle, the number of passengers, the braking force of vehicle, the maximum braking force of vehicle, the driving mode of vehicle (an autonomous driving mode or a manual driving mode), the parking mode of vehicle (an autonomous parking mode, an automatic parking mode, a manual parking mode), whether a user is boarded in a vehicle, the condition and information of the boarding user inside the vehicle (for instance, whether or not the user is an authenticated person).

The surrounding information of the vehicle may include the state of a road surface on which the vehicle is travelling (a friction force, existence of pothole, the type of a road surface, and the like), weather, a distance from a front (or, rear) vehicle, a relative speed of a front (or, rear) vehicle, location information of other vehicles, location information of an object, a curvature of a lane when a driving lane is a curve, an ambient brightness of the vehicle, information associated with an object existing in a reference region (a predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, the ambient brightness, the temperature, the position of the sun, the nearby subject (a person, another vehicle, a sign, etc.) information, the type of a road surface that a vehicle is travelling, the landmark, line information, driving lane information), and information required for an autonomous driving/an autonomous parking/an automatic parking/a manual parking mode.

Furthermore, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Furthermore, the surrounding information associated with the vehicle may further include information associated with driving of the vehicle, whether or not a fellow passenger is boarded next to a driver of the vehicle, and information associated with contents outputted to the display unit.

The information associated with the driving of the vehicle may include information associated with a driving of the vehicle (a general mode, a sports mode, Eco mode, etc.), a speed of the vehicle, acceleration/deceleration of the vehicle, and the like.

Whether or not a fellow passenger is boarded next to a driver may be decided (determined) by an image received through the internal camera 220 of the sensing unit 810, or the DSM (Driver Status Monitoring) system.

The sensing unit 810 may decide (determine) whether or not a fellow passenger is boarded next to the driver by using the sensor (for instance, a pressure sensor) formed on a seat provided within the vehicle.

The information associated with the contents outputted to the display unit may include a type of the contents (for instance, video, image, graphic object, webpage, various information, etc.), an output type/an output size/an output ratio of the execution screen of the contents when the contents is outputted, and information on whether the contents is linked to bend the display unit. The information associated with the contents outputted to the display unit may be sensed by the sensing unit 810, or sensed (detected, determined, decided, extracted) by the processor 870.

Hereinafter, for the sake of convenience of explanation, a configuration in which the sensing unit 820 is additionally provided in the vehicle control device 800 will be described as an example. Allowing the processor 870 to acquire any information through the sensing unit 820 may be understood as allowing the processor 870 to acquire any information using at least one of the object detecting apparatus 300 and the sensing unit 120 provided in the vehicle 100.

The display unit 820 included in the vehicle control apparatus 800 of the present disclosure is a display device provided in the vehicle, and may be the display unit 251 as described before.

The display unit 820 may be the output unit 250 or the display unit 251 described in FIG. 7. Further, the display unit 820 may include a transparent display. The transparent display may be fixed to a wind shied or a window.

The display unit 820 may be disposed on one region 251a, 251b or 251e of the instrument panel, one region 251d of the seat, one region 251f of each pillar, one region 251g of the door, one region of the center console, one region of the head lining, or one region of the sun visor, or may be embodied on one region 251c of the wind shield, or one region 251h of the window.

For instance, the display unit 820 may include a Cluster, a CFD (Center Facia Display), a navigation device, and a HUD (Head-Up Display).

The processor 870 may output various information associated with vehicles to the display unit 820. Further, the processor 870 may output the information associated with vehicles to different positions of the display unit 820 according to the types of the information.

Figure 10:
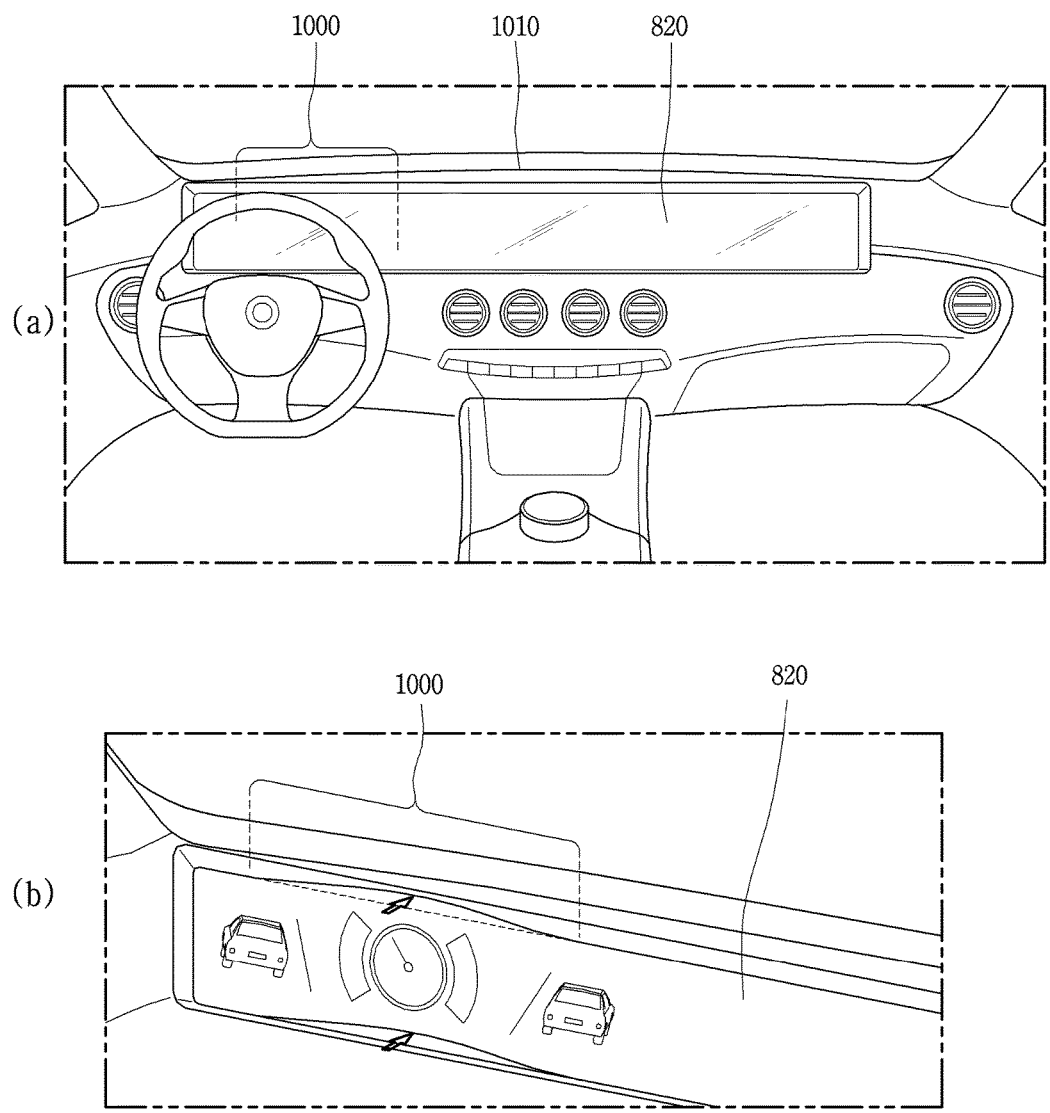
FIGS. 10, 11, 12, 13, 14, 15, 16, 17, and 18 are conceptual views for explaining the control method of FIG. 9.

Further, referring to FIG. 10, the display unit 870 in accordance with the present disclosure is provided at one region of the instrument panel 1010 (or a dash board), and configured to output (provide) the contents to a driver or a fellow passenger.

Further, as shown in FIG. 10, the display unit 870 in accordance with the present disclosure may be configured by an integral combination of the cluster and the CID, or may mean only the cluster.

The display unit 820 may be configured to be bendable (or curved). Here, the bending may mean that at least one region of the display unit is bent, curved, folded, or bent or the bent (curved, folded) portion is straightened.

The display unit 820 may be disposed such that its front surface is directed to a driver and/or a fellow passenger. That is, the front surface of the display unit 820 may be disposed towards a rear side of a vehicle.

The display unit 820 in accordance with the present disclosure may be bent in a concave or convex form.

Here, the concave bending of the display unit 820 may mean that at least one part of the display unit 820 is bent or curved towards a front side of a vehicle (or an inner side of a dash board) such that an apex of the bending region (a bending point) is moved towards a front side of a vehicle, or becomes distant from a driver and/or a fellow passenger). Further, the concave bending of the display unit 820 may mean that at least one part of the display unit 820 is sunk in a front side of a vehicle.

Further, the convex bending of the display unit 820 may mean that at least one part of the display unit 820 is bent or curved towards a rear side of a vehicle (or an opponent direction to a dash board) such that an apex of the bending region (a bending point) is moved towards a rear side of a vehicle, or gets near to a driver and/or a fellow passenger). Further, the convex bending of the display unit 820 may mean that at least one part of the display unit 820 is protruded towards a rear side of a vehicle.

The at least one part of the display unit in the description may mean one part (or a partial region) of the display or the entirety of the display.

When at least one part of the display unit 820 is bent, an apex (or a bending point) may exist at the bent at least one part. The apex (or a bending point) may mean the spot(s) which are the mostly moved by the bending at the bent at least one part of the display unit 820. Further, when the bending is made at a plurality of one parts, the apex may mean the most sunk/protruded portion among the plurality of one parts.

Since the display unit is bent based on any one axis, the apex may exist in plural, and the plurality of apexes may form one side (or one line).

In the description, explanation is made based on a plane view in order to more intuitively explain the bending shape of the display unit. When one apex of the bending portion is seen in the plane view, the apex is seen in plural in a front view and may form one side (or one line).

The display unit 820 may be bent symmetrically or asymmetrically.

The display unit 820 may be bent by various structures. The present disclosure may adopt/apply every structure which can bend the display. Embodiments of the present disclosure to bend the display unit 820 will be described with reference to FIG. 20A through FIG. 20C.

The various forms of bending of the display unit 820 will be described more specifically with reference to the accompanying drawings later.

Further, the vehicle control device 800 in accordance with the present disclosure may include a processor 870 which is capable of controlling the sensing unit 810 and the display unit 820.

The processor 870 may be the controller 170 as described in FIG. 7.

The processor 870 may control the components as described in FIG. 7 and the components as described in FIG. 8.

The processor 870 may control the display unit such that at least one part of the display unit is bent, based on information associated with a vehicle sensed by the sensing unit 810.

Hereinafter, description will be made of a vehicle control method to control the volume of the sound generated by a driving of a vehicle to be lower than a preset volume with reference to the accompanying drawings.

Figure 9:
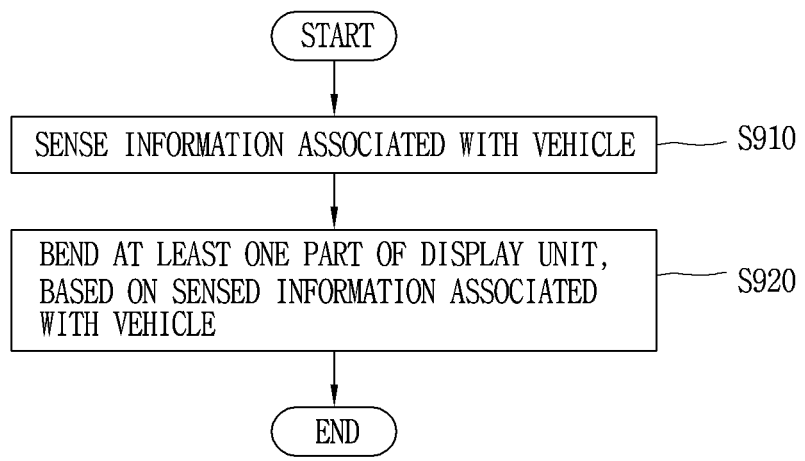
FIG. 9 is a flow chart for explaining a representative control method according to an embodiment of the present disclosure.

FIG. 9 is a flow chart for explaining a representative control method in accordance with an embodiment of the present disclosure, FIGS. 10, 11, 12, 13, 14, 15, 16, 17, and 18 are conceptual views for explaining the control method of FIG. 9.

Referring to FIG. 9, a step for sensing information associated with a vehicle is proceeded (S910). Specifically, the processor 870 may sense information associated with a vehicle, using the sensing unit 810.

The processor 870 may control the sensing unit 810 to sense information associated with a vehicle based on that a preset condition is satisfied. For instance, the processor 870 may control the sensing unit 810 to sense information associated with a vehicle, based on that a driving of a vehicle is started, a driving speed of vehicle exceeds a preset speed, a fellow passenger is boarded, or contents is executed.

The information associated with a vehicle may include, as described above, information associated with a driving of a vehicle, whether or not a fellow passenger is boarded next to a driver of a vehicle, and information associated with contents outputted to the display unit.

The information associated with a driving of a vehicle may include a driving mode (a general mode, a sports mode, an Eco mode, etc.) of a vehicle, the speed of vehicle, and an acceleration/deceleration of a vehicle.

Whether or not a fellow passenger is boarded next to a driver may be determined (decided) by an image received through an internal camera 220 of the sensing unit 810, or by a DSM (Driver Status Monitoring) system.

The sensing unit 810 may determine (decide) as to whether or not a fellow passenger is boarded next to a driver, using a sensor (for instance, a pressure sensor) formed on a seat provided within a vehicle.

In the description, an explanation is made on an assumption that a driver is boarded on a driver's seat when a vehicle is travelling. Further, the fellow passenger may mean a seat next to a driver's seat (that is, a passenger boarded next to a driver), but not limited to this, and may also include passengers boarded on the rear seat.

The information in association with contents outputted to the display unit may include the type of contents (for instance, video, image, graphic object, webpage, various information, etc.), the output type/the output size/the output ratio of the contents execution screen when the contents is outputted, and information as to whether the contents is the contents which is linked to bend the display unit. The information associated with the contents outputted to the display unit may be sensed by the sensing unit 810, or sensed (detected, determined, decided, extracted) by the processor 870.

Hereinafter, a step for bending at least one part of the display unit, based on the sensed information associated with a vehicle is proceeded (S920).

Specifically, the display unit 820 included in the vehicle control device 800 (or provided in the vehicle 100) in accordance with the present disclosure may be provided within a vehicle, as shown in FIG. 10, and formed to be bendable.

The display unit 820 may be a display which is incorporated by at least two of the cluster, the CID, and the navigation device, and as shown in FIG. 10, may be formed long in a widthwise direction of a dashboard 1010. Through this, a driver and a fellow passenger may use the display unit 820 simultaneously, or different part of the display unit 820 independently.

The processor 870 may bend at least part of the display unit 820, based on that the sensed information associated with a vehicle satisfies the condition (preset condition) linked to bend the display unit 820.

Here, the condition may mean the information associated with a vehicle which is linked (set) to bend the display unit 820, and various embodiments (that is, information associated with a vehicle) described in the present disclosure may be included in the above condition.

Further, the processor 870 may bend the display unit 820 in different forms according to the types of the sensed information (types of condition) associated with a vehicle. For instance, the processor 870 may bend the display unit 820 such that an apex (bending point) may be formed at different positions, or in different forms according to the types of the sensed information (types of information) associated with a vehicle.

Here, the display unit 820 may be bent in a concave or convex form, or to include concave and convex portions together with a plurality of flections.

Further, the processor 870 may determine as to whether to bend the display unit 820 in a concave or convex form, according to the types of the sensed information (or condition) associated with a vehicle.

For instance, the information (or condition) associated with a vehicle may be linked to information which is set to bend the display unit 820 in a concave form, or information which is set to bend the display unit 820 in a convex form.

Further, the processor 870 may determine as to whether to bend the display unit 820 in part or entirely, according to the types of the sensed information (or condition) associated with a vehicle.

For instance, the information (or condition) associated with a vehicle may be linked to information which is set to bend the display unit 820 in part, or information which is set to bend the display unit 820 entirely.

Hereinafter, a specific explanation will be made of the embodiments on the types of information associated with a vehicle, and the types of bending of the display unit 820 by information associated with a vehicle, with reference to FIGS. 10 through 18.

Referring to FIG. 10, the display unit 820 in accordance with the present disclosure may be disposed on a dashboard 1010 of the vehicle 100 such that a front surface of the display unit 820 may face a driver/a fellow passenger. Further, the display unit 820 may be a hetero type display which has a long sides in a widthwise direction so that a driver and a fellow passenger can easily operate the display unit 820.

The processor 870 may bend at least part 1000 of the display unit 820 based on that the information associated with a vehicle sensed by the sensing unit 810 corresponds to the preset condition (for instance, the condition linked to bend at least part of the display unit 820), as shown in FIG. 10.

Figure 11:
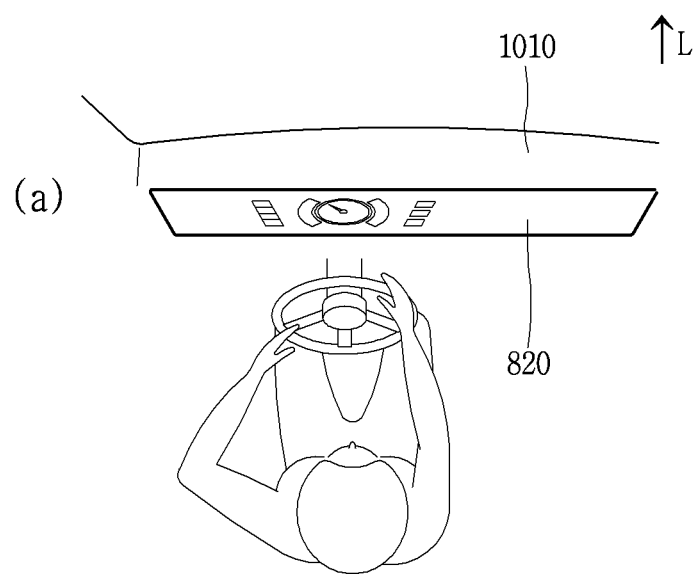
Figure 11:
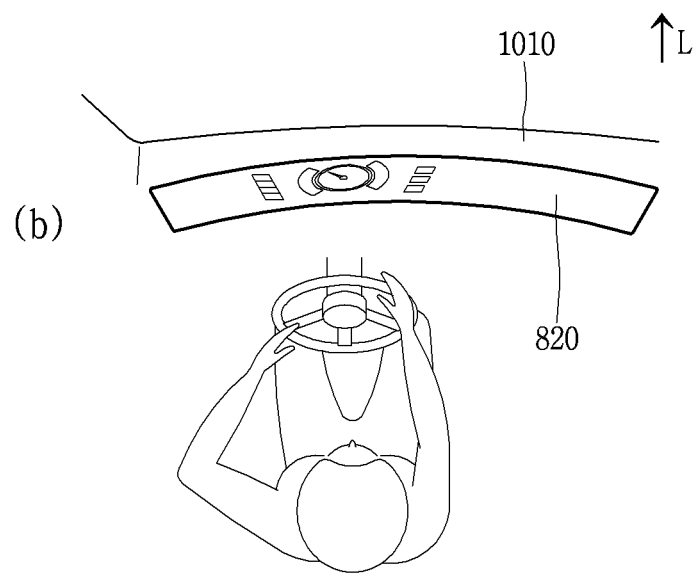

Referring to FIG. 11, one of the information associated with a vehicle sensed by the sensing unit 810 may correspond to whether or not a driving mode of a vehicle enters a preset driving mode. Specifically, the driving mode may include a plurality of driving modes, for instance, a manual driving mode and an autonomous driving mode. Further, the manual driving mode may include various driving modes, such as a general driving mode, a sports mode, and an Eco mode.

The processor 870 may decide (determine) as to whether or not the driving mode of a vehicle enters a preset driving mode (for instance, a sports mode).

Until the driving mode of a vehicle enters a preset driving mode, the display unit 820 may be maintained flat, as shown in FIG. 11A.

As shown in FIG. 11B, when the driving mode of a vehicle enters a preset driving mode, the processor 870 may bend the preset part of the display unit 820. Here, the preset part may be the entirety of the display unit 820, as shown in FIG. 11(b), or part 1000 corresponding to a space where a steering wheel is located, as shown in FIG. 10(b).

For instance, when the driving mode of a vehicle in accordance with the present disclosure enters a sports mode, it may bend the preset part of the display unit 820 on which the information (for instance, a speedometer, an RPM meter, etc.) displayed on a cluster is displayed in a concave form, so as to concentrate on the driving of a vehicle.

Thus, according to the present disclosure, since a user can increase an attentiveness on the concave bent portion, it is possible to improve the safety and convenience for a driver.

Meanwhile, the processor 870 may output first information (for instance, a speedometer, an RPM meter, etc.), information associated with a driving of a vehicle (for instance, fuel efficiency, an average speed, the types of lit lamps, icons to indicate troubled portion), etc.) to the display unit 820 (or the preset part of the display unit 820).

When the preset part of the display unit 820 is bent in a state that the first information associated with a vehicle is being outputted, the processor 870 may output second information which is different from the first information to the display unit 820 (or the preset part of the display unit 820).

The second information is associated with a vehicle, and may mean information that at least one of the information included in the first information is omitted, or information that the display method has been changed.

For instance, the second information may include a speedometer or an RPM meter. The second information may not include the information associated with driving of a vehicle which has been included in the first information.

The speedometer (or, the RPM meter) which is included in the second information may be displayed in a different manner from the speedometer (or, the RPM meter) which is included in the first information. For instance, the speedometer which is included in the second information may be outputted in an enlarged scale than the speedometer which is included in the first information.

That is, when the driving mode of a vehicle enters a preset driving mode (for instance, a sports mode), the processor 870 may bend the preset part of the display unit 870 in a concave form.

Further, the processor 870 may display the first information associated with a vehicle on the preset part 1000 before bending, but may display the second information which is different from the first information associated with a vehicle on the preset part 1000 after bending. That is, when the driving mode of a vehicle enters a preset driving mode, the processor 870 may control the display unit 820 to change the display method such that part of the information among the information which is being outputted is not outputted, and remaining information is outputted in an enlarged scale.

Further, as shown in (b) of FIG. 10, when the preset part 1000 of the display unit 820 is bent based on that the driving mode of a vehicle enters a preset driving mode, the processor 870 may output images, which are received through cameras (refer to 310b of FIG. 2) disposed at both sides (left and right) of the vehicle 100, to regions adjacent to the preset part 1000.

The regions adjacent to the preset part 1000 may be, for instance, flat, but not limited to this, and may be in a bent state to form flections similarly to the preset part 1000.

A first image received through a camera which is disposed to capture the left side of a vehicle may be outputted to a region which is adjacent to the preset part 1000 (bent region) at the left side, and a second image received through a camera which is disposed to capture the right side of a vehicle may be outputted to a region which is adjacent to the preset part 1000 (bent region) at the right side.

That is, the processor 870 in accordance with the present disclosure may bend the preset part 1000 based on that the driving mode of a vehicle enters a preset driving mode, and output images received through the cameras disposed to capture left and right sides of a vehicle to regions (left region, right region) adjacent to the preset part 1000.

Through the above configurations, the present disclosure can enhance a driver's attentiveness by bending one part of the display unit 820 and at the same time output images received through the cameras disposed at left and right sides of a vehicle to the display unit, when the driving mode of a vehicle enters a mode requiring a high speed driving. Thus, since it is possible to provide images corresponding to a screen which is seen from a side mirror without any distractions of driver's eyes, a user interface which is optimized to a high speed driving can be provided.

The above description may be identically/similarly applied to the driving speed of vehicle.

Specifically, the processor 870 may sense the speed of vehicle, and when the speed exceeds a preset range, bend a preset part of the display unit 820. In this instance, the preset part may be bent in a concave form.

Further, the processor 870 may output first information associated with the driving of a vehicle to the display unit (or a preset part of the display unit) until the speed of vehicle exceeds a preset speed, and when the speed of vehicle exceeds the preset speed (or when the preset part of the display unit is bent), output second information instead of the first information to the display unit (or a preset part of the display unit).

Further, when the speed of vehicle exceeds a preset value and the preset part of the display unit 820 is bent, the processor 870 may output images received through the cameras disposed to capture sides of a vehicle to the region adjacent to the preset part.

The processor 870 may determine a bending degree of the preset part of the display unit 820 in proportion to the speed of vehicle. For instance, the higher the speed of the vehicle is, the larger the bending degree of the preset part is.

Further, when the speed of vehicle exceeds a preset value in a state that the preset part of the display unit is bent, the processor 870 may maintain the bending degree of the preset part.

For instance, when the speed of vehicle is less than 80 Km/h, the processor 870 may maintain the display unit 820 flat, while when the speed of vehicle is 80 Km/h~160 Km, bend the preset part of the display unit 820 according to the speed of vehicle (the degree of bending may be proportional to the speed of vehicle), and when the speed of vehicle exceeds 160 Km/h, maintain the bending degree to that when the speed of vehicle is 160 Km/h.

In this instance, the processor 870 may output images received through the cameras disposed at sides of a vehicle to capture both sides to a region(s) adjacent to the preset one region even when the speed of vehicle exceeds 160 Km/h (That is, it is possible to maintain the output).

Further, when the speed of vehicle returns to a speed below the preset value in a state that the preset part of the display unit 820 is bent, the processor 870 may convert (transform, deform, change) the display unit 820 from a bent state into a flat state.

Meanwhile, the processor 870 may sense an angle between the vehicle 100 and the sun (or an angle of sunlight incident to the vehicle or the intensity of radiation of the sun light) through the sensing unit 810.

The processor 870 may bend at least one part of the display unit 820, based on the angle between the vehicle and the sun. For instance, as shown in (b) of FIG. 11, the processor 870 may bend at least one part of the display unit 820 in a concave form such that the sun light does not dazzle the driver's eyes when the driver sees the display unit 820.

In this instance, the processor 870 may determine the curvature (or curvature radius) that at least one part of the display unit 820 is bent, based on the angle between the vehicle and the sun (or an angle of sunlight incident to the vehicle or the intensity of radiation of the sun light).

Through the above configurations, the present disclosure is possible to provide a new display unit in which at least one part of the display unit can be bent in order to prevent the visibility of the display unit from being deteriorated according to the incident angle of the sun light or the intensity of radiation of the sun light.

Meanwhile, the present disclosure is possible to bend at least part of the display unit 820, based on whether or not a fellow passenger is boarded next to a driver of a vehicle.

The processor 870 in accordance with the present disclosure may determine as to whether or not a fellow passenger is boarded next to a driver through the sensing unit 810. Thereafter, the processor 870 may bend the display unit 820 in different forms according to the determination result.

Figure 12:
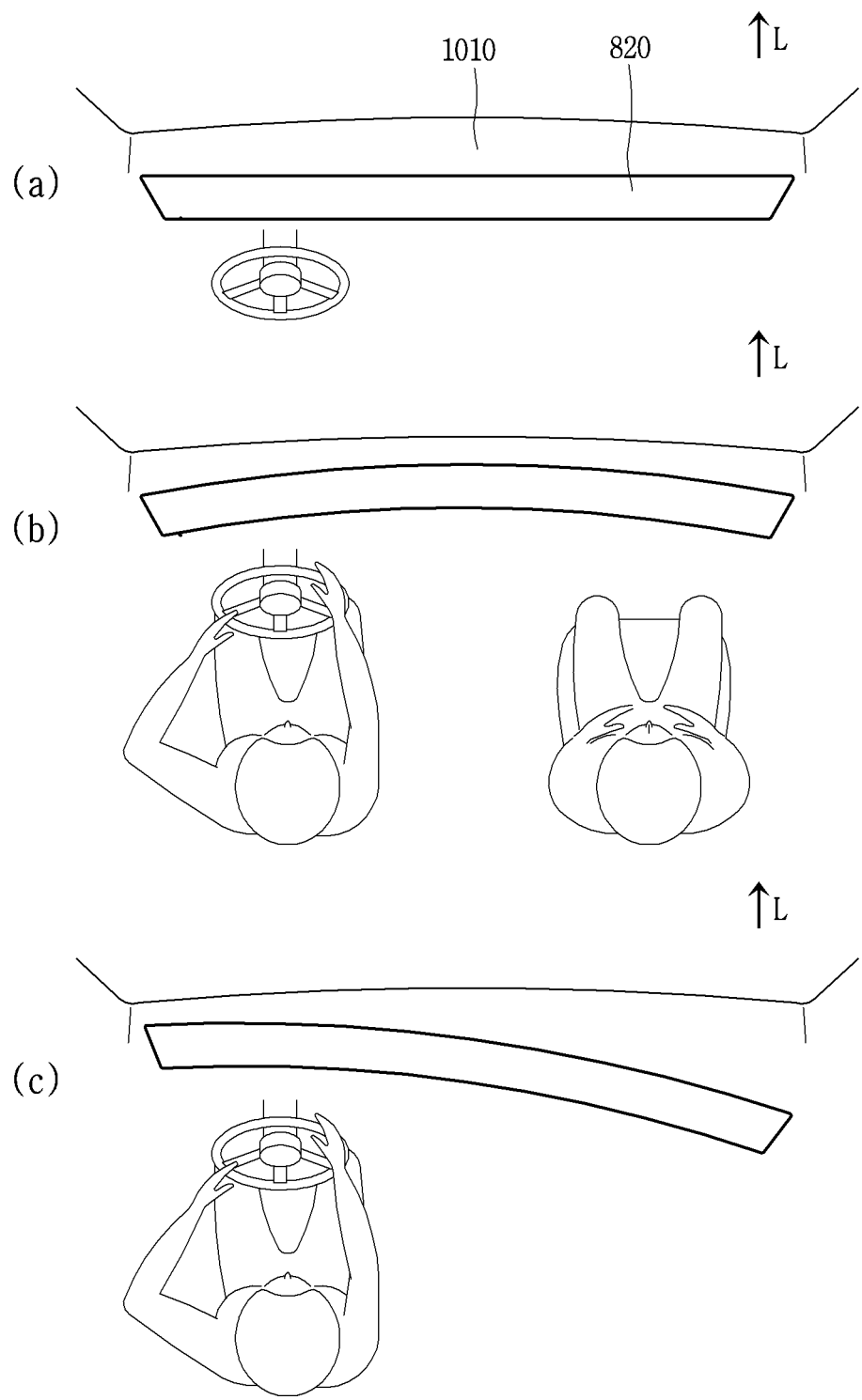

As, shown in (a) of FIG. 12, the display 820 may be flat. Thereafter, the processor 870 may determine (sense, decide, extract, detect) as to whether or not a fellow passenger is boarded next to a driver (that is, whether only a driver is boarded, or whether a driver and a fellow passenger next to the driver are boarded) through the sensing unit 810.

Thereafter, as shown in (b) of FIG. 12, when a fellow passenger is boarded next to a driver, the processor 870 may bend the display unit 820 into a first form, and when only a driver is boarded, as shown in (c) of FIG. 12, the processor 870 may bend the display unit 82 into a second form which is different from the first form. For instance, the first form may be that the display unit 820 is symmetrically bent, as shown in (b) of FIG. 12. For instance, when it is determined (sensed) that a driver and a fellow passenger next to the driver are boarded together, the processor 870 may bend the display unit 820 in a concave (convex) form symmetrically.

For another instance, the second form may be that the display unit 820 is asymmetrically bent, as shown in (c) of FIG. 12. For instance, when it is determined (sensed) that only a driver is boarded, the processor 870 may bend the display unit 820 in a concave form, but asymmetrically bend the display unit 820 such that one side (far side from a driver) is moved (bent) more than another side (near side from a driver).

Meanwhile, with no limitation to the above, the present disclosure can variously control the display unit 820 according to whether or not a fellow passenger is boarded next to a driver.

Figure 13:
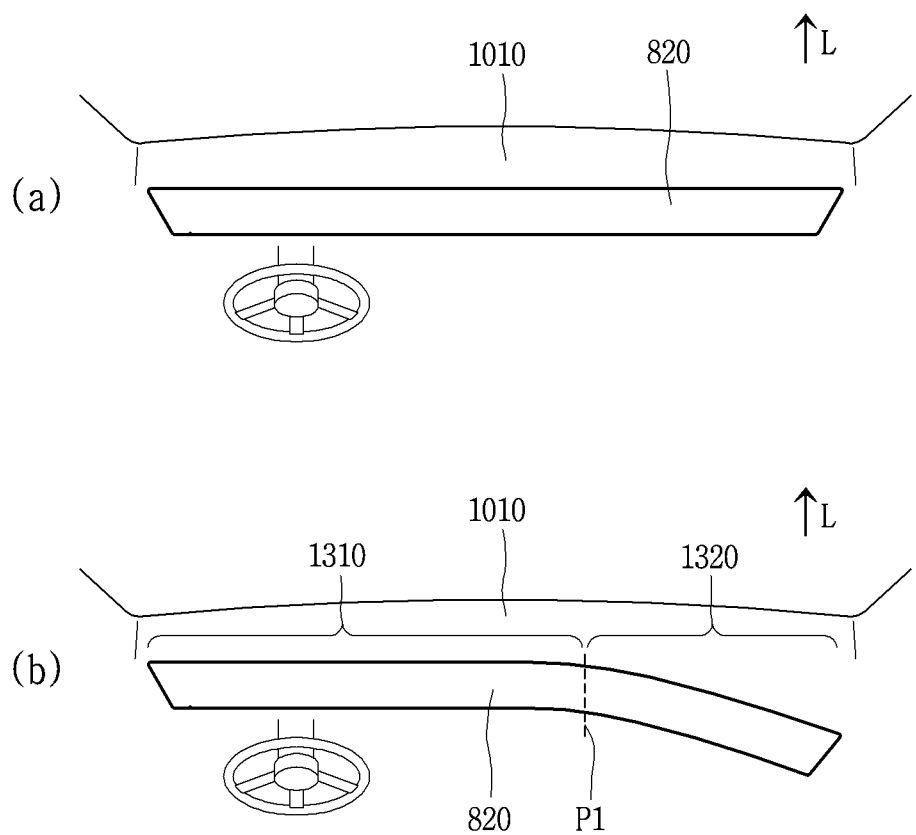

For instance, as shown in (a) of FIG. 13, when a fellow passenger is boarded next to a driver of a vehicle, the processor 870 may maintain the display unit 820 flat, without bending the display unit 820.

On the contrary, when only a driver is boarded in the vehicle 100 (or when a fellow passenger got off the vehicle 100 after boarding), the processor 870 may bend at least one part of the display unit 820 such that a partial region 1320 of the display unit 820, which is disposed towards a seat on which the fellow passenger has sat among the display unit 820, faces a driver, as shown in (b) of FIG. 13.

In this instance, the display unit 820 may have an apex (bending point) P1 at one side of the partial region 1320, and the partial region 1320 (far side from a driver) of the display unit 820 may be bent (moved) towards a driver.

In this instance, the partial region 1320 of the display unit 820 may be bent in a concave form, and other (remaining) regions 1310 of the display unit 820 may be flat, or a predetermined region adjacent to the partial region 1320 may be bent in a concave form.

Through the above configurations, the present disclosure is possible to provide a vehicle control method in which when a fellow passenger is boarded next to a driver, both the driver and the fellow passenger can watch the display unit 820 at an optimized viewing angle, and when only a driver is boarded, it is possible to provide an optimized display unit to a driver.

Also, the present disclosure is possible to provide the effects in that when only a driver is boarded, the viewing angle (and a distance from a driver to a far side) is reduced so that a driver can more conveniently watch and operate a far side from a driver (or one part of the display unit disposed at a seat on which a fellow passenger is boarded) among the display unit by curving the display unit 820 which is formed long in a widthwise direction towards a driver.

Meanwhile, the present disclosure may bend at least one part of the display unit 820 based on information associated with contents outputted to the display unit 820.

For instance, the processor 870 may sense (determine, decide) that a plurality of contents is outputted to the display unit 820. The processor 870 may output a plurality of contents based on a user input of a driver and/or a passenger.

In this instance, when a vehicle is in a driving mode, the processor 870 may output the plurality of contents to the display unit 820. Here, a steering wheel positioned in front of the display unit 820 may be moved so as not to be positioned in front of the display unit 820 in an autonomous mode.

The plurality of contents may not mean information associated with a vehicle driving (for instance, speed information, RPM information, vehicle condition information), but the contents such as videos, images, broadcasts, and webpage which are executed by a user.

Further, when a plurality of contents is outputted to the display unit 820, the processor 870 may bend the display unit 820 in a convex form. Through this, the present disclosure can provide a plurality of contents which is outputted to the display unit to a driver and a fellow passenger, respectively, at an optimized angle.

When a plurality of contents is outputted to the display unit 820, the processor 870 may bend the display unit 820 such that the apexes of the regions where the display unit 820 is bent may be formed at different positions, based on the types of the plurality of outputted contents.

Figure 14:
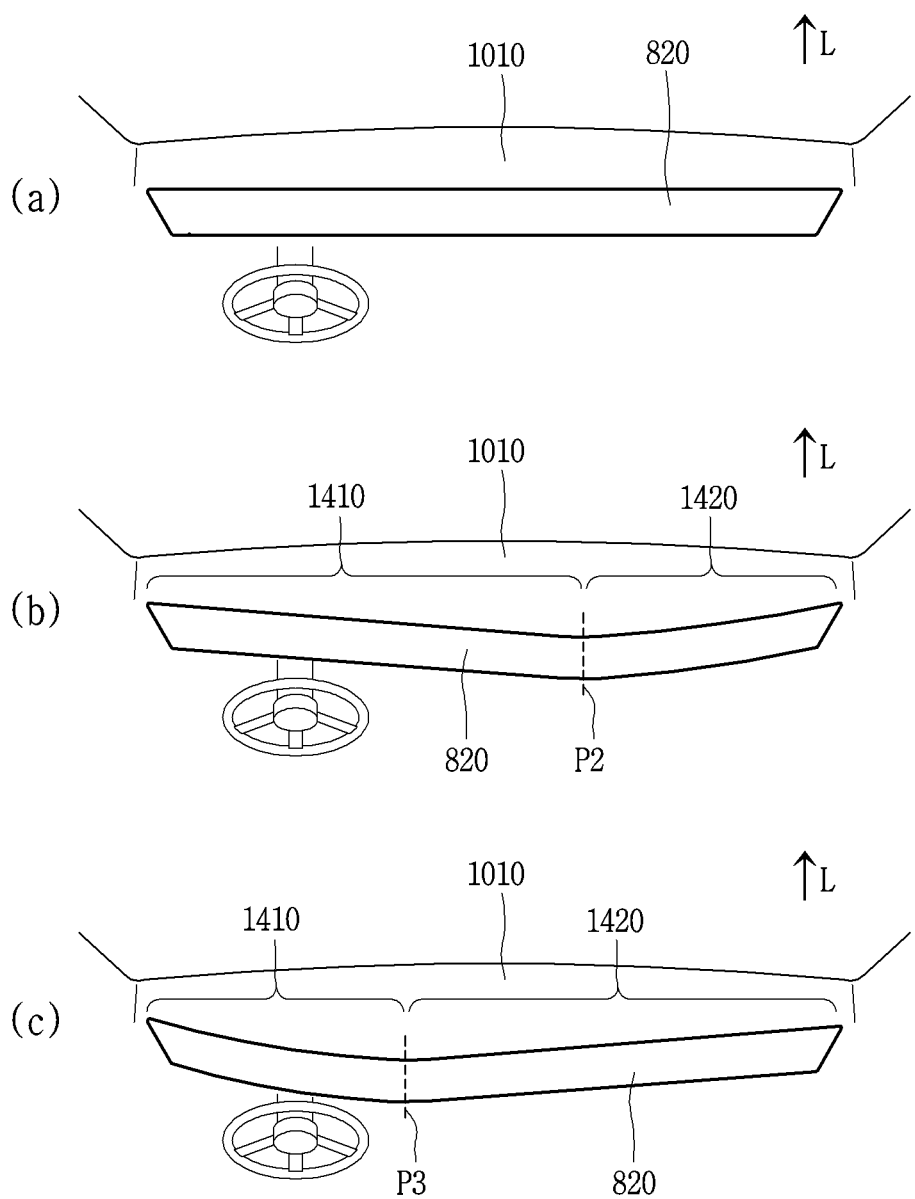

For instance, as shown in (a) of FIG. 14, when the plurality of contents are executed (outputted) in a state that the display unit 820 is flat, the processor 870 may output the plurality of contents (1410 and 1420, or 1430 and 1440) to the display unit 820.

In this instance, the processor 870 may bend the display unit 820 in different forms, based on the types of the plurality of contents which are outputted to the display unit 820. Here, bending in different forms may mean that the display unit 820 is bent such that the apexes P2 and P3 of the region where the display unit 820 is bent are located at different positions.

For instance, as shown in (b) of FIG. 14, when the first content 1410 is movie, and the second content 1420 is webpage among the plurality of contents which are outputted to the display unit 820, the processor 870 may bend the display unit 820 such that the apex P2 is the first position. In this instance, the first position may be located between the first content 1410 and the second content 1420.

For another instance, as shown in (c) of FIG. 14, when the third content 1430 is webpage and the fourth content 1440 is a movie among the plurality of contents which are outputted to the display unit 820, the processor 870 may bend the display unit 820 such that the apex P3 is a second position which is different from the first position. In this instance, the second position may be located between the third content 1430 and the fourth content 1440.

That is, the processor 870 in accordance with the present disclosure may bend the display unit 820 such that an apex of the region where the display unit is bent may be located at different positions, based on the types (or output ratio of each of the plurality of contents) of the plurality of contents which are outputted to the display unit 820.

In other words, when a plurality of contents are outputted, the processor 870 may bend the display unit 820 such that an apex of the region where the display unit is bent may be located between the first contents and the second contents which are included in the plurality of contents.

In this instance, the processor 870 may sense at least one eyes (eyes direction) between a driver and a fellow passenger through the sensing unit 810, and determine the bending degree of the display unit 820, based on the sensed eyes.

For instance, the processor 870 may bend the display unit 820 in a concave form such that at least one eyes direction between a driver and a fellow passenger may be incident upon the display unit at rectangular.

To this end, the processor 870 may bend the display unit 820 such that the bending degree of the display unit 820 to be convex is smaller when an angle between at least one's eyes direction between a driver and a fellow passenger and a widthwise direction of a vehicle gets larger (that is, as at least one's eyes direction between a driver and a fellow passenger faces towards a front side of a vehicle), and that the bending degree of the display unit 820 to be convex is larger when an angle between at least one's eyes direction between a driver and a fellow passenger and a widthwise direction of a vehicle gets smaller (that is, as at least one's eyes direction between a driver and a fellow passenger faces towards a side surface of a vehicle).

This is because at least one's eyes direction between a driver and a fellow passenger has to be vertical to the display unit 820 where the first and second contents are outputted.

Meanwhile, the contents may include the contents linked to bend the display unit and the contents linked to maintain the display unit flat. For instance, the contents linked to bend the display unit may include videos, broadcasts, games, etc. and the contents linked to maintain the display unit flat may include webpage, images, video calls, etc. and such contents are just examples, but not limited thereto.

Figure 16:
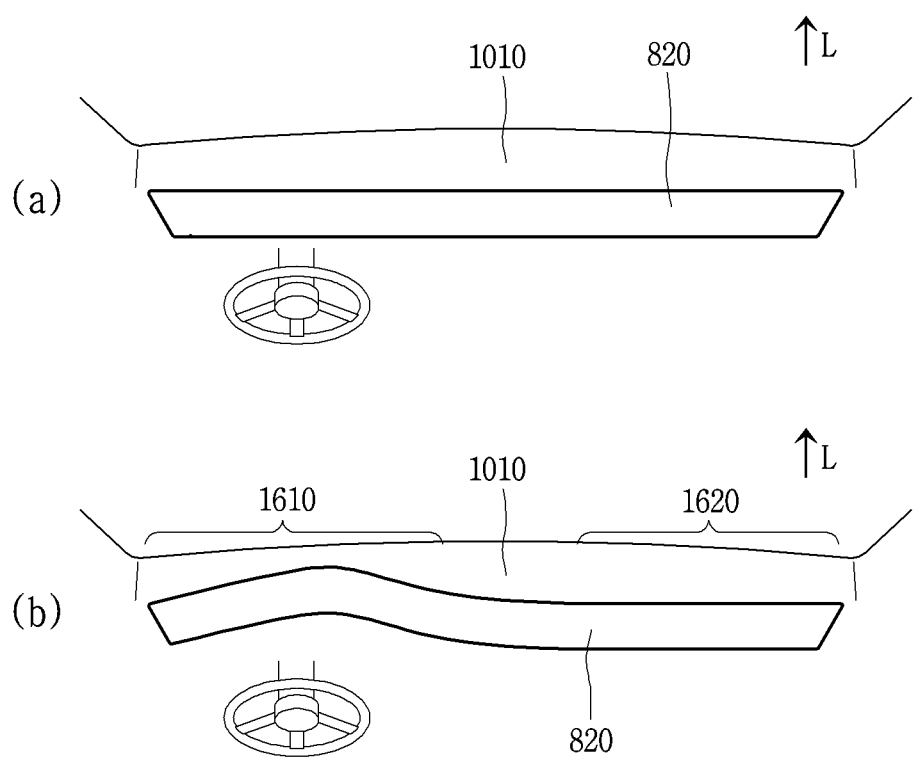

As shown in FIG. 16, when a plurality of contents are outputted in a state that the display unit 820 is flat, the processor 870 may bend only part of the display unit 820, based on the types of the outputted contents.

Specifically, as shown in (b) of FIG. 16, the first contents 1610 among the plurality of contents may be the contents linked to bend the display unit 820, and the second contents 1620 which is different from the first contents 1610 may be the contents linked to maintain the display unit 820 flat. In this instance, The processor 870 may bend only the portion where the first contents 1610 is outputted on the display unit 820.

In this instance, (b) of FIG. 16 illustrates that the display unit 820 is bent in a concave form, but not limited thereto. Whether or not the display unit 820 is bent in concave or convex may be determined by the information linked to the first contents 1610 (or the type of the first contents 1610).

Figure 17:
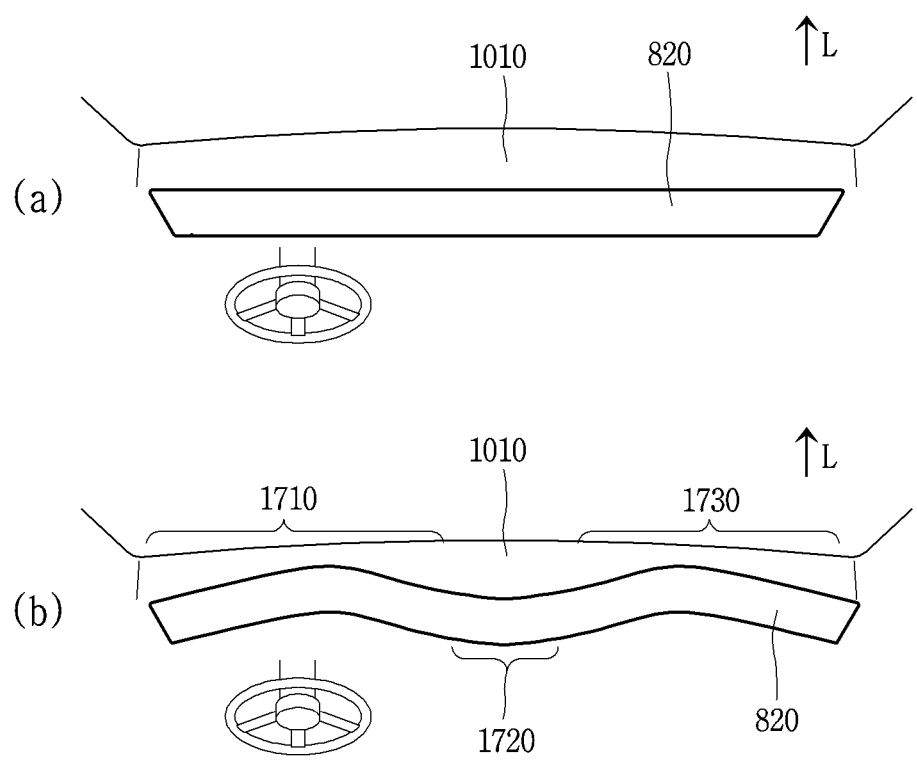

Meanwhile, referring to FIG. 17, when all the plurality of contents are the contents 1710 and 1730 linked to bend the display unit in a concave form, the processor 870 may bend the regions where the plurality of contents 1710 and 1730 are outputted on the display unit 820, as shown in FIG. 17(*b*).

In this instance, the region 1720 where the plurality of contents are not outputted on the display unit 820 may be bent relatively in convex.

On the region 1720 which is bent in convex, a screen (for instance, a menu screen, a controller, an operation interface, etc.) capable of controlling the plurality of contents may be outputted, or information associated with a driving of the vehicle 100 may be outputted.

Figure 18:
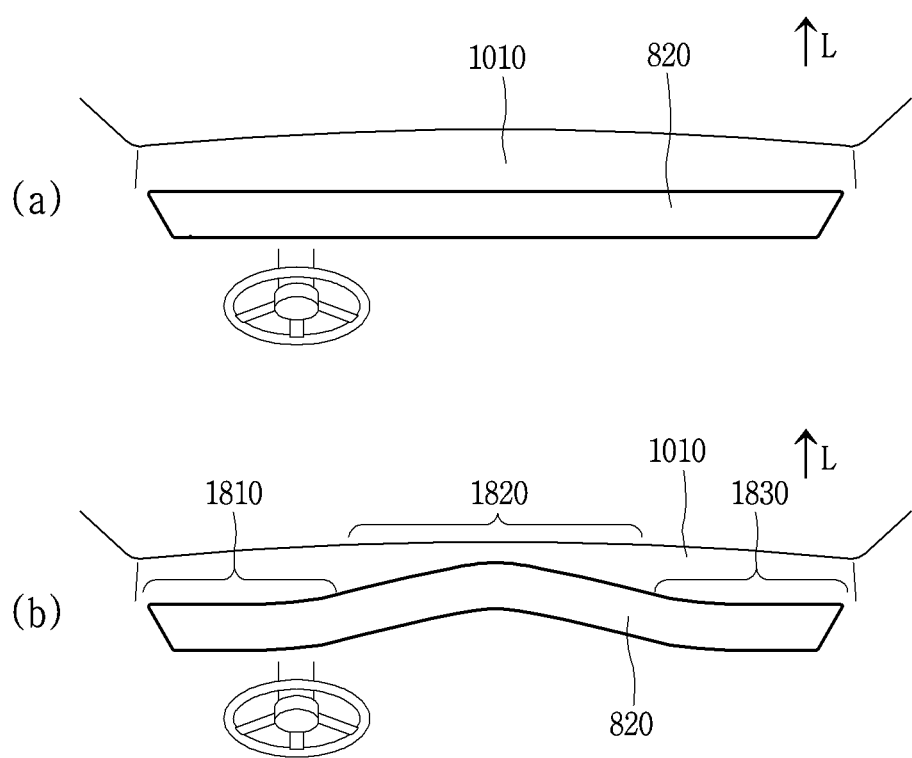

Meanwhile, referring to FIG. 18, when one contents 1820 is outputted to the display unit 820, and in a case where the contents 1820 is the contents linked to bend the display unit 820 in concave, the processor 870 may bend a region 1820 where the contents 1820 is outputted in concave, and maintain the regions 1810 and 1830 adjacent to the region 1820 flat.

In this instance, images received through the cameras disposed at sides of a vehicle may be displayed on the regions 1810 and 1830, respectively, or an interface which can execute contents that each of a user or a fellow passenger demands may be outputted.

According to the present disclosure, it is possible to provide a display unit which is capable of outputting more than three different contents by outputting desired contents to adjacent regions 1810 and 1830 by a driver and a fellow passenger through the interface.

Further, the processor 870 may move the contents linked to bend the display unit, based on the user interface. That is, the display position of the contents may be changed, based on the user interface.

In this instance, the processor 870 may vary a region (one part) where the display unit is bent or an apex of the region where the display unit 820 is bent, based on the change of the display position of the contents.

For instance, when the contents are moved to the right, the bent region (or the apex) may be moved to the right of the display unit. For another instance, when the contents are moved to the left, the bent region (or the apex) may be moved to the left of the display unit.

That is, the processor 870 may change at least one bent part of the display unit, depending on movement of the contents linked to bend the display unit 820. Meanwhile, as shown in (b) of FIG. 15, the processor 870 may output a first image received through a camera disposed to capture the left side of a vehicle to a first region 1510 of the display unit 820, and a second image received through a camera disposed to capture the right side of a vehicle to a second region 1520 which is different from the first region 1510.

The first image may be an image corresponding to a screen (scene) which can be seen through an existing left side mirror by a driver, and the second image may be an image corresponding to a screen (scene) which can be seen through an existing right side mirror by a driver.

The first and second images may be outputted to the display unit 820, based on that a preset condition is satisfied.

For instance, as described above, the processor 870 may output the first and second images to the display unit 820, based on that the driving mode of a vehicle enters a preset driving mode (for instance, a sports mode), or the speed of a vehicle exceeds a preset value.

For another instance, the processor 870 may output the first and second images to the display unit 820, based on that a user requests (for instance, a user's request to output the first and second images to the display unit), or a turn signal is turned on.

The first region 1510 and the second region 1520 may be different parts of the display unit 820. For instance, the first and second regions 1510 and 1520 may be the regions which are adjacent to the preset bent region 1000, as shown in (b) of FIG. 10.

Figure 15:
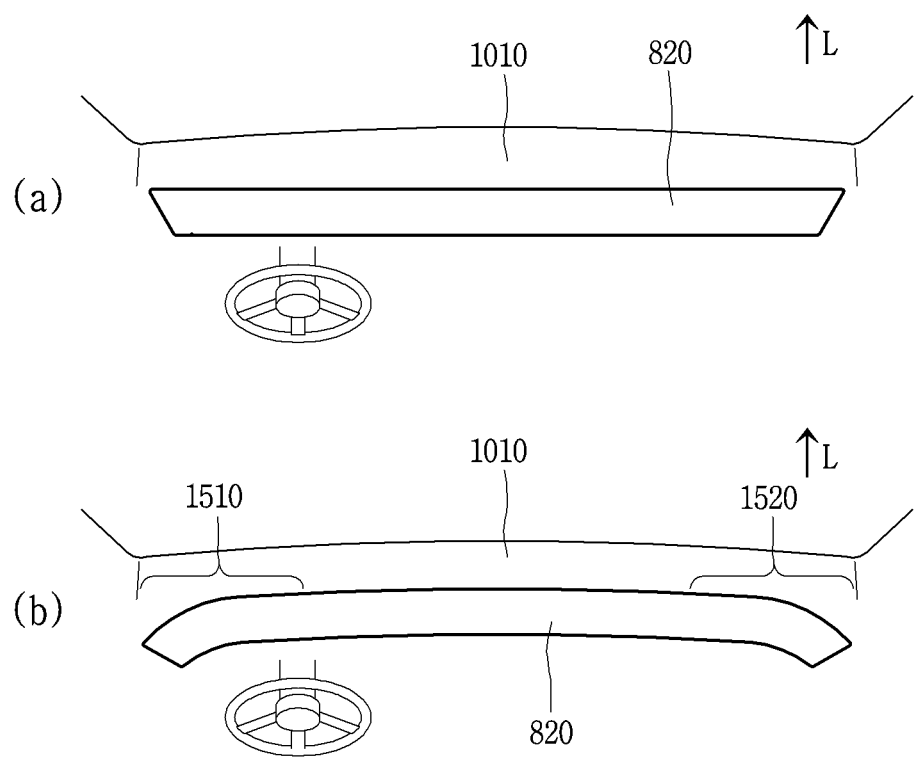

For another instance, as shown in (b) of FIG. 15, the first region 1510 may be a region which is adjacent to a left side of the display unit 820, and the second region 1520 may be a region which is adjacent to a right side of the display unit 820.

Meanwhile, the processor 870 may bend at least one of the first and second regions 1510 and 1520 to which the first and second images are outputted, respectively, of the display unit 820, based on the lighting of the turn signal.

Specifically, when the turn signal is turned on in a state that the first and second images are outputted, the processor 870 may bend one of the first and second regions 1510 and 1520, based on the indicated direction of the turn signal.

Here, the turn signal is one of lamps provided at a vehicle, which is turned on when it is intended to change the lane or in emergency situations, and may be disposed at left and right sides in the front of a vehicle and left and right sides of the rear of a vehicle.

For instance, when a user input to turn on the turn signal at the left side is received, the turn signals at the front left side, the rear left side and/or the turn signal provided at the left side of a vehicle among the indicators may be turned. In this instance, the direction that the turn signal is turned on is left.

For another instance, when a user input to turn on the turn signal at the right side is received, the turn signals at the front right side, the rear right side and/or the turn signal provided at the right side of a vehicle among the indicators may be turned. In this instance, the direction that the turn signal is turned on is right.

As shown in (b) of FIG. 15, when the turn signal is turned on in a state that the first and second images are outputted, the processor 870 may bend one of the first region 1510 to which the first image is outputted and the second region 1520 to which the second image is outputted.

For instance, when the direction that the turn signal is turned on is left, the processor 870 may bend the first region 1510 to which the first image received through the camera disposed to capture the left side of a vehicle is outputted. For another instance, when the direction that the turn signal is turned on is right, the processor 870 may bend the second region 1520 to which the second image received through the camera disposed to capture the right side of a vehicle is outputted.

In this instance, as shown in FIG. 15, the processor 870 may bend the display unit 820 such that the first region and/or the second region faces (or, in a concave form) the driver.

Through the above configurations, the present disclosure can provide a vehicle control device and a control method of a vehicle, which are capable of bending part of the display unit in an optimized manner such that a driver can see the first and/or second images more carefully and easily, when a driver turns on a turn signal to change the lane.

Hereinafter, description will be provided more specifically of bending the display by a user's manual operation, with reference to the accompanying drawings.

FIGS. 19A, 19B, 20A, 20B, and 20C are conceptual views for explaining a method for bending a display unit according to an embodiment of the present disclosure.

Figure 19A:
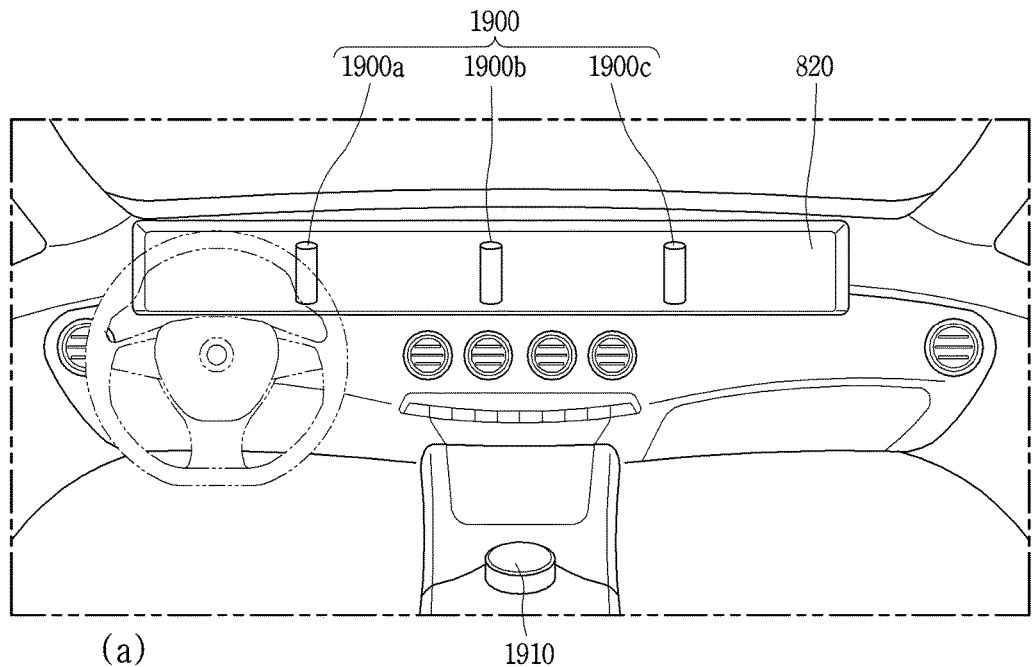
FIGS. 19A, 19B, 20A, 20B, and 20C are conceptual views for explaining a method for bending a display unit according to an embodiment of the present disclosure.
Figure 19A:
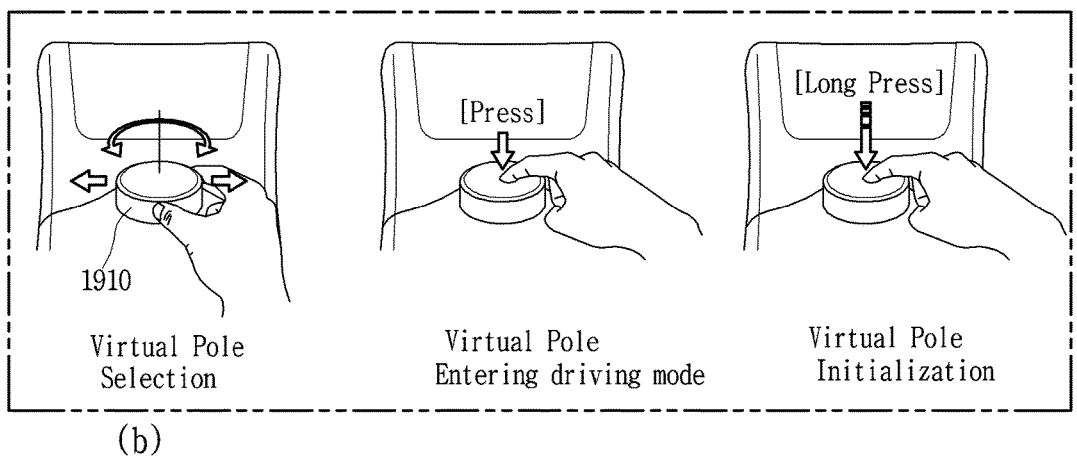
Figure 19A:
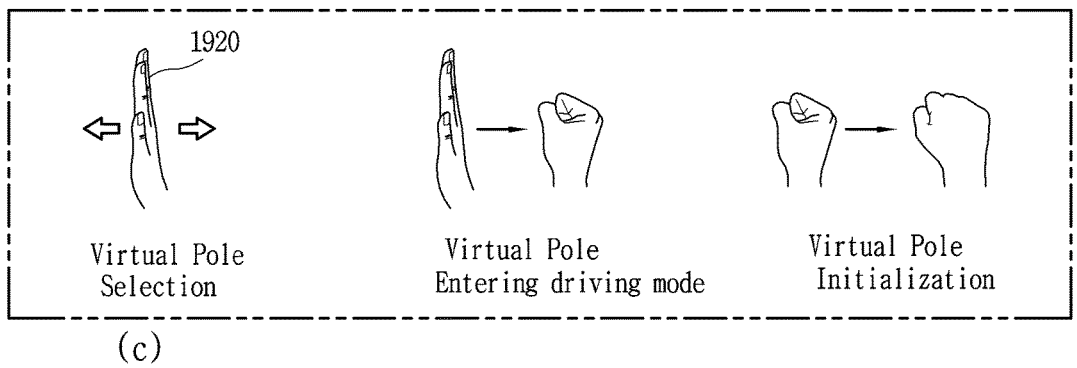

Referring to (a) of FIG. 19A, the processor 870 may output at least one graphic object 1900 which guides an apex of the region where the display unit 820 is bent, based on a user's request.

The number of the graphic object 1900 may correspond to the number of poles 2000 (refer to FIG. 19B) provided at a rear surface of the display unit 820, and the position where the graphic object 1900 is outputted may correspond to the position of the pole 2000.

When a preset user input is applied in a state that at least one graphic object is outputted, the processor 870 may bend the display unit 820 so that the position where the graphic object is outputted may be an apex of the region where the display unit 820 is bent.

Here, the user input may be a user input unit 1910 (for instance, a knob or a user gesture 1920) which is provided in a vehicle. For instance, the user gesture may be a movement of a user's hand, a hand movement, or a touch applied to the display.

Specifically, the processor 870 may select at least one graphic object based on a user input in a state that at least one graphic object 1900a, 1900b or 1900c is outputted.

For instance, when the plurality of graphic objects 1900a, 1900b and 1900c is displayed on the display unit 820, one of the plurality of graphic objects 1900a, 1900b and 1900c may have a different display method from remaining ones.

The graphic object (for instance, 1900b) which has a different display method may mean a graphic object to be selected.

The processor 870 may change the graphic object to be selected, based on the first preset user input (for instance, an input to rotate or move a wheel of the user input unit 1910 to the left/right, or a gesture to move to the left or right in a state that a user's hand is opened).

The processor 870 may select a graphic object which has a different display method to be selected, based on a preset second user input (for instance, a gesture to apply a pressure to the user input unit 1910, or to grip a user's hand).

Thereafter, the processor 870 may bend the display unit 820 in a concave or convex form so that the spot where the selected graphic object 1900 is outputted may be an apex of a bent region, based on a movement of a preset third user input (for instance, a gesture to move the user input unit 1910 in front/rear directions, or to move in front/rear directions in a state that a user's hand is clenched.

Figure 19B:
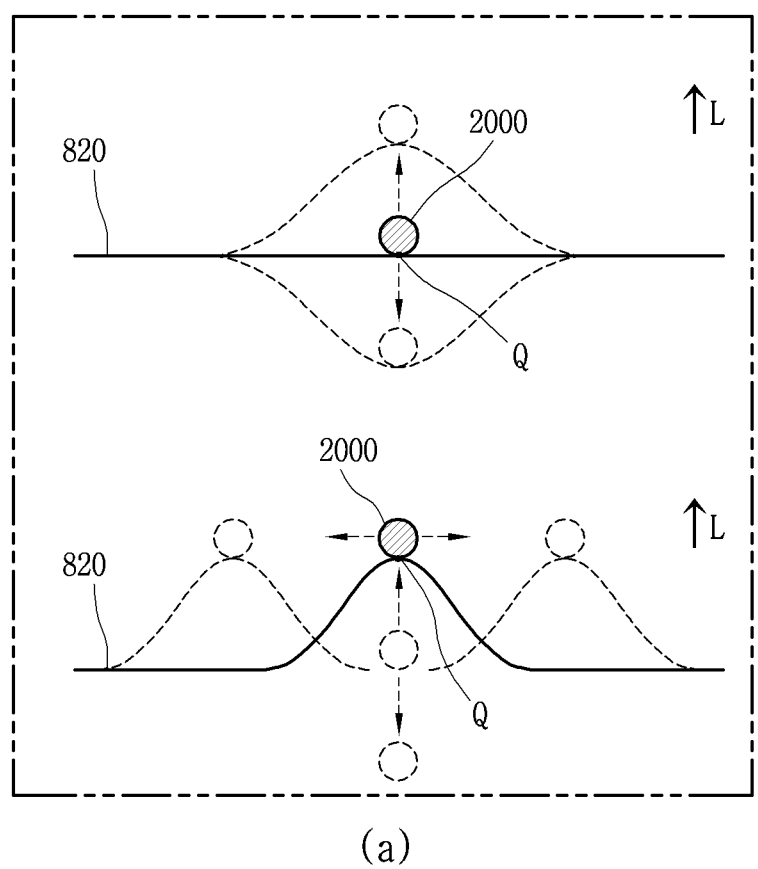
Figure 19B:
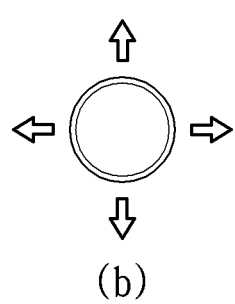
Figure 19B:
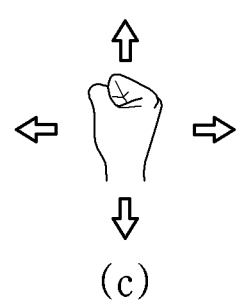

For instance, referring to FIG. 19B, when the user input unit 1910 is moved in a front direction or a user's hand is moved in a front direction in a clenched state, the processor 870 may bend the display unit 820 such that the portion where the selected graphic object 1900 is outputted may be moved in the front direction of a vehicle (that is, the display unit 820 may be bent in a concave form based on the spot where the graphic object 1900b is outputted, so as to be an apex Q of the region where the graphic object 1900b is bent in a concave form).

For another instance, when the user input unit 1910 is moved in the rear direction or the user's hand is moved in the rear direction in a clenched state, the processor 870 may bend the display unit 820 such that the portion where the selected graphic object 1900b is outputted may be moved in the rear direction of a vehicle (that is, the display unit 820 may be convex based on the spot where the graphic object 1900b is outputted, so as to be an apex Q of the region where the graphic object 1900b is bent in a convex form).

Further, when a preset fourth user input (for instance, a gesture to apply a pressure to the user input unit 1910 more than a predetermined time, or to rotate a user's clenched hand) is applied, the processor 870 may transform the bent region of the display unit 820 in a flat form (Initialization).

The user gesture may be sensed by the sensing unit 810 and, for instance, may be determined based on the image received through the internal camera 220.

Further, when a plurality of user's hands is sensed, the processor 870 may select at least two graphic objects among the graphic objects 1900a, 1900b and 1900c which are outputted to the display unit 820.

Thereafter, the processor 870 may bend plural parts of the display unit 820 in response to the user gestures performed by the plurality of user's hands.

Through the above configurations, the present disclosure can provide a vehicle control device and a control method of a vehicle, in which a user can more instinctively bend at least one part of the display unit.

Figure 20A:
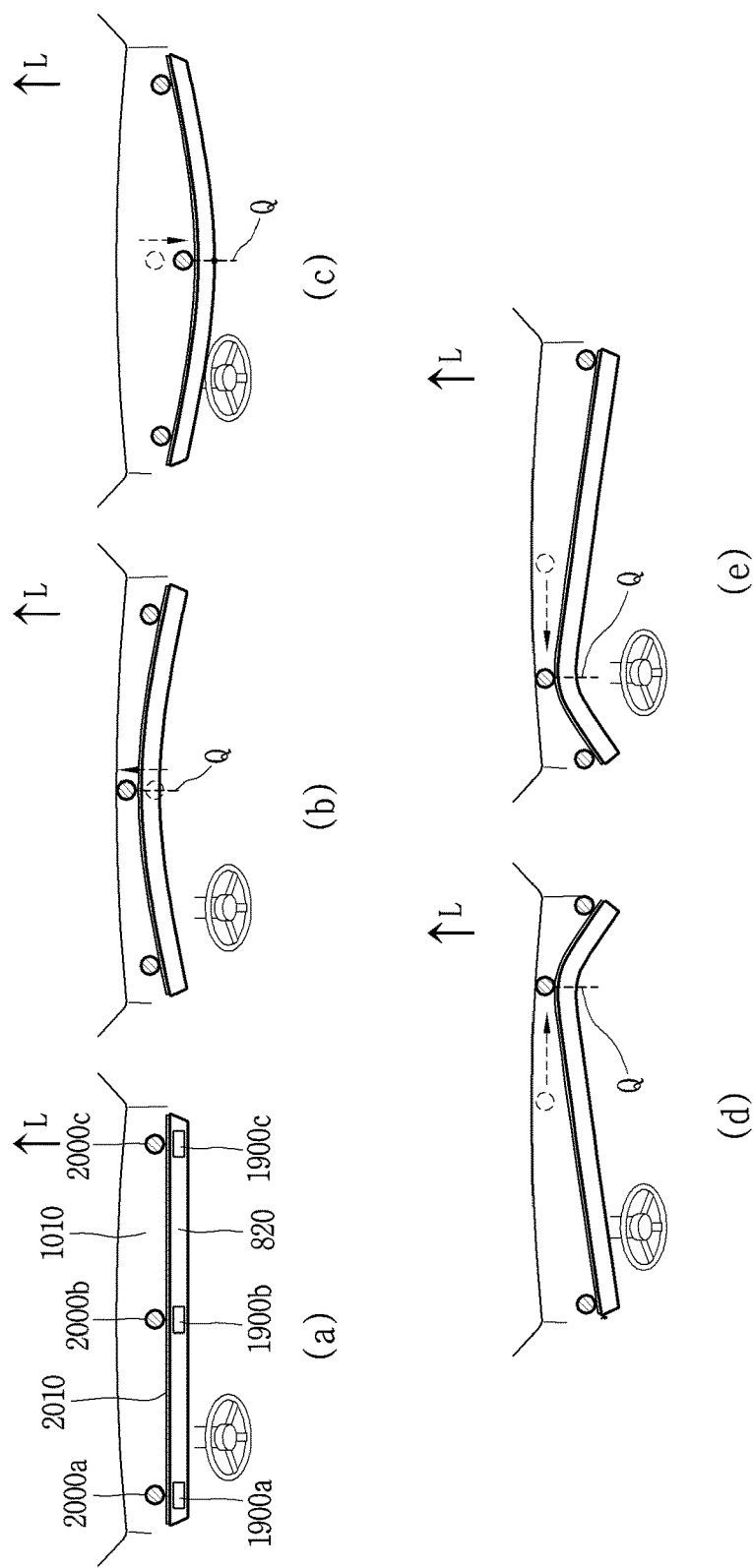
Figure 20B:
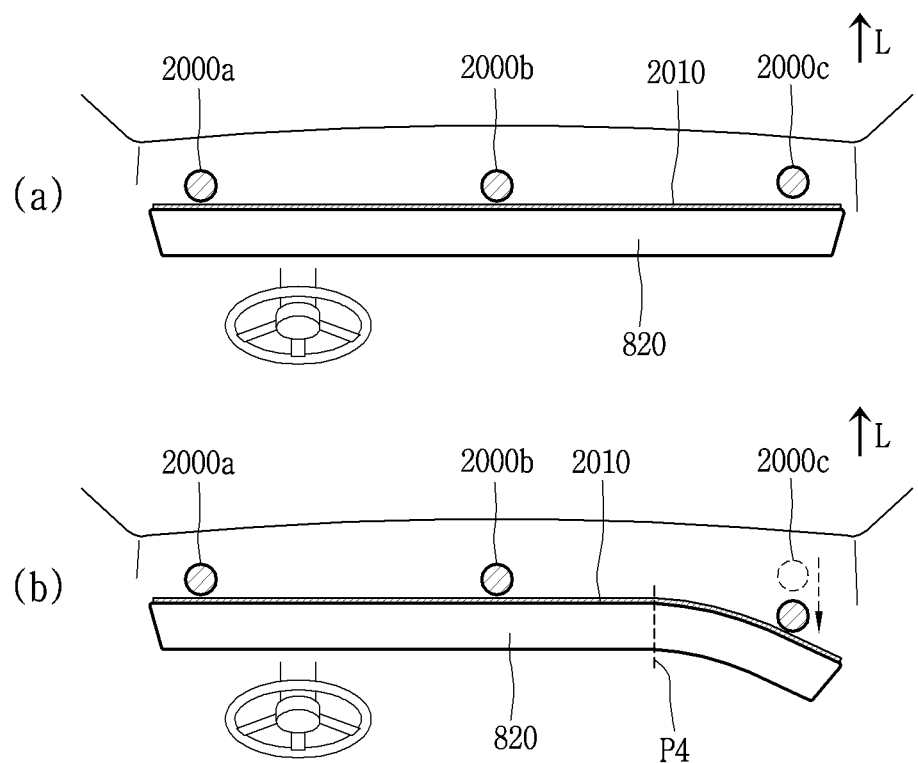
Figure 20C:
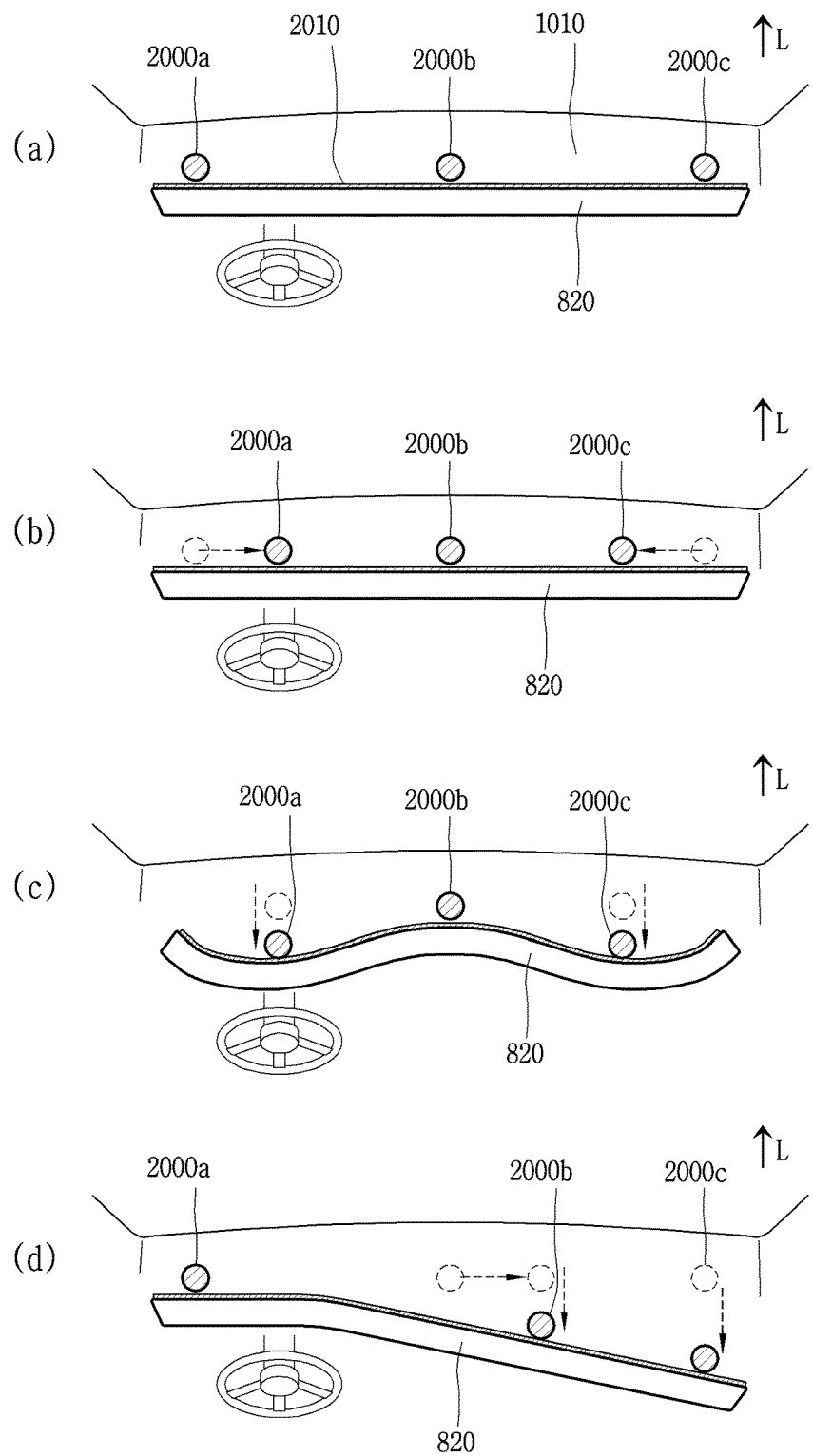

FIGS. 20A, 20B, and 20C are conceptual views for explaining a method for bending the display unit 820 according to an embodiment of the present disclosure.

Referring to FIG. 20A, a rail 2010 for moving a pole 2000 may be provided at a rear side surface of the display unit 820.

The rail 2000 may be provided at a rear surface of the display unit 820 so as to correspond to a widthwise (left and right) direction of the display unit 820.

The rear surface of the display unit 820 where the rail is provided may face the inside of a dashboard 1010 so that the rail 2010 may not be exposed to outside. The rail 2010 may be formed of a flexible material which is bendable.

The rail 2010 may include at least one pole 2000a, 2000b, 2000c, or 2000. For instance, the pole 2000 may be coupled to the rail 2000 in a slidable manner. Thus, the pole 2000 may be moved in the left and right directions in a state that it is coupled to the rail 2010.

The at least one pole 2000 may be connected to a driving unit (not shown), respectively. The driving unit may be operated under the control of the processor 870, and may move the at least one pole 2000 in the left/right and front/rear directions.

As shown in (a) of FIG. 20A, at least one graphic object 1900a, 1900b and 1900c which guides an apex of the region where the display unit is bent, may be outputted to correspond to the at least one pole 2000a, 2000b and 2000c.

When one (for instance, 2000b) of the poles 2000a, 2000b and 2000c is moved to the left/right by the preset user input, the display position of the graphic object 1900*c* corresponding to one pole 2000*b* among the at least one graphic object 1900*a*, 1900*b* and 1900*c* may be changed.

When the preset third user input is received after one 1900*b* of the at least one graphic object 1900*a*, 1900*b* and 1900*c* is selected, the processor 870 may drive the pole 2000*b* corresponding to the selected graphic object 1900*b* in response to the third user input.

For instance, when the preset third user input is an input to move the user input unit toward a front side, the processor 870 may move the pole 2000*b* corresponding to the selected graphic object 1900*b* in front of a vehicle, as shown in (b) of FIG. 20A. Thus, when the pole 2000 is moved in front of a vehicle, the rail connected to the pole 2000*b* is moved in front of a vehicle, thereby the display unit 820 connected to the rail 2010 is bent in a concave form.

In this instance, the spot where the graphic object 1900*b* is outputted to correspond to the pole 2000*b* may be an apex Q of the bent region.

For another instance, when the preset third user input is an input to move the user input unit toward a rear side, the processor 870 may move the pole 2000*b* corresponding to the selected graphic object 1900*b* in the rear of a vehicle, as shown in (c) of FIG. 20A. Thus, when the pole 2000 is moved in the rear of a vehicle, the rail connected to the pole 2000*b* is moved in the rear of a vehicle, thereby the display unit 820 connected to the rail 2010 is bent in a convex form.

In this instance, the spot where the graphic object 1900*b* is outputted to correspond to the pole 2000*b* may be an apex Q of the bent region.

Meanwhile, the unselected poles 2000*a* and 2000*c* among the poles 2000*a*, 2000*b* and 2000*c* may be maintained (fixed) at the previous position.

Meanwhile, the present disclosure may vary the bending form (or the position of an apex of the bent region) through a manual operation.

As shown in (d) and (e) of FIG. 20A, when the preset third user input (for instance, an input to move the user input unit 1910 to the left and right) is received after the pole 2000*b* corresponding to the selected graphic object 1900*b* is moved in the front/rear directions, the processor 870 may move the pole 2000*b* to the right and left so as to correspond to the third user input.

The movement of the pole 2000*b* to the right and left may be executed by the driving unit through the rail 2010, and thus the bending form (or the position of the apex Q of the bent region) may be varied (changed).

Referring to FIG. 20B, when at least one 1900*c* of the at least one graphic objects shown in FIG. 19A is selected, the processor 870 may select the pole 2000*c* corresponding to the selected graphic object 1900*c* among the at least one poles 2000*a*, 2000*b* and 2000*c*.

Thereafter, when the preset third user input (for instance, an input to move the user input unit 1910 in the rear direction) is applied, the processor 870 may move the selected pole 2000*c* in the rear direction of a vehicle (the front direction of the display unit), as shown (b) of FIG. 20B.

When the pole 2000*c* is moved in the rear direction, the rail 2010 connected to the pole 2000*b* is moved depending on the movement of the pole 2000*b*, thus the display unit 820 connected to the rail 2010 is bent in a convex form (or one side of the display unit faces a user).

FIG. 20C illustrates a method to bend simultaneously a plurality of parts of the display unit 820.

As described hereinabove, when a plurality of hands are sensed through the sensing unit 810, the processor 870 may select at least two graphic objects 1900*a* and 1900*c* based on the positions of the sensed hands. For instance, when the position of left hand is hovered around the position corresponding to the first graphic object 1900*a* and the position of right hand is hovered around the position corresponding to the third graphic object 1900*c*, the processor 870 may select the first and third poles 1900*a* and 1900*c*. In this instance, the processor may select the first and third poles 2000*a* and 2000*c* corresponding to the first and third graphic objects 1900*a* and 1900*c*.

Thereafter, the processor 870 may drive the plurality of poles 2000*a* and 2000*c* based on the user gesture which is executed by the plurality of sensed hands.

For instance, when the sensed left hand is moved to the right and the sensed right hand is moved to the left, as shown in (b) of FIG. 20C, the processor 870 moves the first pole 2000*a* to the right and the third pole 2000*c* to the left. In this instance, the display unit 820 may be maintained flat. In this instance, the unselected second pole 2000*b* may be maintained (fixed) in its previous position.

Thereafter, as shown in (c) of FIG. 20C, when a gesture that right and left hands are moved in the rear of a vehicle is sensed, the processor 870 may move the first and third poles 2000*a* and 2000*c* to the rear side of a vehicle. By the movement of the first and third poles 2000*a* and 2000*c*, the display unit 820 may be bent to have two bent regions in a convex form and one bent region in a concave form.

In this instance, the display unit 820 has an apex of the region bent in a convex form at the spots P6 and P6 corresponding to positions of the first and third poles 2000*a* and 2000*c*, and an apex of the region bent in a concave form at the position of the second pole.

On the contrary, as shown in (d) of FIG. 20C, when the second and third poles 2000*b* and 2000*c* are selected, the second pole 2000*b* is moved to the rear of a vehicle as much as a first distance after moving to the left, and the third pole 2000*c* is moved to the rear of a vehicle as much as a second distance which is longer than the first distance, the display unit 820 may be bent such that part of the display unit 820 is bent to face a driver, while having one spot between the first pole 2000*a* and the second pole 2000*b* as an apex P8.

Such a pole should not be driven depending on the preset user input, but by the processor 870 when the conditions described in the description, such as the vehicle driving mode, the angle to the sun, a plurality of contents are outputted, and the like are satisfied.

Further, the present disclosure can embody various bending forms of the display through the methods as described above.

According to the embodiments of the present disclosure, there are one or more effects as below.

First, the present disclosure can provide a vehicle and a vehicle control method which are capable of bending the display unit provided at a vehicle in an optimized form.

Second, the present disclosure can provide a vehicle and a vehicle control method which are capable of bending the display unit according to the types of information (conditions) in an optimized form.

Third, the present disclosure can provide a vehicle and a vehicle control method which are capable of bending the display unit by a user's operation in an optimized form.

The effects of the present disclosure are not limited to the aforesaid, but further effects which are not referred to may be apparently understood to those skilled in the art through the accompanying claims.

The vehicle control device 800 may be included in the vehicle 100.

Further, the operations and control methods of the vehicle control device 800 as described above may be similarly/identically applicable to the operations and control methods of the vehicle 100 (or the controller 170).

For instance, the control method of the vehicle 100 (or the control method of the vehicle control device 800) may include a step for sensing information related to a vehicle and a step for bending at least one part of the display unit based on the sensed information related to a vehicle.

The above process may be carried out by the controller 170 provided in the vehicle 100 as well as by the vehicle control device 800.

Furthermore, every function, configuration or control method executed by the vehicle control device 800 may be executed by the controller 170 provided in the vehicle 100. In other words, every control method disclosed herein may be applicable to the control method of the vehicle, and also applicable to the control method of the control device.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device provided in a vehicle, the vehicle control device comprising:
   a display unit configured to bend;
   a driving unit configured to bend the display unit; and
   a processor configured to:
     receive information associated with the vehicle from a sensing unit of the vehicle; and
     instruct the driving unit to bend at least a part of the display unit based on a sensed information associated with the vehicle,
   wherein the processor is configured to:
     determine that a driving mode of the vehicle is set to a preset driving mode;
     based on the determination that the driving mode of the vehicle is set to the preset driving mode, instruct the driving unit to bend a preset part of the display unit; and
     determine a bending degree of the preset part of the display unit in proportion to a speed of the vehicle based on the information associated with the vehicle.

2. The vehicle control device of claim 1, wherein the processor is configured to:
   determine that the sensed information associated with the vehicle satisfies a condition associated with bending of the display unit; and
   based on the determination that the sensed information associated with the vehicle satisfies the condition associated with bending of the display unit, instruct the driving unit to bend at least a part of the display unit.

3. The vehicle control device of claim 1, wherein the processor is configured to instruct the driving unit to bend at least a part of the display unit based on the sensed information associated with the vehicle by instructing the driving unit to bend the display unit into different shapes based on types of the sensed information associated with the vehicle.

4. The vehicle control device of claim 3, wherein the sensed information associated with the vehicle comprises at least one of information associated with driving of the vehicle, information associated with presence of a passenger in a front passenger seat, or information associated with contents displayed on the display unit.

5. The vehicle control device of claim 3, wherein the sensed information associated with the vehicle comprises positions of the sun and the vehicle, and wherein the processor is configured to:
   determine an angle of incidence of sunlight incident on the display unit based on the position of the sun and the position of the vehicle; and
   instruct the driving unit to bend the display unit based on the determined angle of incidence of the sunlight.

6. The vehicle control device of claim 3, wherein the processor is configured to:
   determine, through the sensing unit, a presence of a passenger in a front passenger seat; and
   instruct the driving unit to bend the display unit in different shapes based on the determination of a presence of a passenger.

7. The vehicle control device of claim 6, wherein the processor is configured to:
   based on a determination that a passenger is present in the front passenger seat, instruct the driving unit to bend the display unit in a first form; and
   based on a determination that a passenger is not present in the front passenger seat, instruct the driving unit to bend the display unit in a second form which is different from the first form.

8. The vehicle control device of claim 6, wherein the processor is configured to:
   based on a determination that a passenger is present in the front passenger seat, instruct the driving unit to maintain the display unit in a flat state; and
   based on a determination that a passenger is not present in the front passenger seat, instruct the driving unit to bend at least a part of the display unit such that a region of the display unit disposed in front of the front passenger seat is oriented toward a driver of the vehicle.

9. The vehicle control device of claim 3, wherein a plurality of content items is displayed on the display unit, and wherein the processor is configured to:
   instruct the driving unit to bend the display unit about a bending point, the bending point varying in position based on respective type or size of each of the plurality of content items displayed on the display unit.

10. The vehicle control device of claim 9, wherein the processor is configured to:
    sense, through the sensing unit, a gaze direction of at least one eye of a driver or a passenger; and
    instruct the driving unit to change a degree of bending of the display unit based on the sensed gaze direction.

11. The vehicle control device of claim 9, wherein:
    a first content item among the plurality of content items is associated with a bent state of the display unit;
    a second content item among the plurality of content items is associated with a flat state of the display unit, the second content item being different from the first content item; and the processor is configured to instruct the driving unit to bend only a portion of the display unit on which the first content item is displayed.

12. The vehicle control device of claim 3, wherein the processor is configured to:
instruct the display unit to display a first image on a first region of the display unit, the first image received through a first camera disposed to capture a left side of a vehicle, and
display a second image, which is different from the first image, on a second region of the display unit, the second image received through a second camera disposed to capture a right side of a vehicle.

13. The vehicle control device of claim 12, wherein the processor is configured to:
determine that a turn signal is turned on; and
based on the determination that the turn signal is turned on, instruct the driving unit to bend one of the first or second region of the display unit according to a direction of the turn signal.

14. The vehicle control device of claim 1, wherein first information is displayed on the display unit, and wherein the processor is configured to:
determine that the preset part of the display unit is bent; and
based on the determination that the preset part of the display unit is bent, instruct the display unit to display second information different from the first information.

15. The vehicle control device of claim 1, wherein the processor is configured to instruct the display unit to display an image received through a camera disposed at a side of the vehicle on a region adjacent to the preset part of the display unit.

16. The vehicle control device of claim 1, wherein the processor is configured to:
determine that a user request for displaying a bending point guide is received; and
based on the determination that the user request for displaying the bending point guide is received, instruct the display unit to display at least one graphic object at a position that corresponds to a bending point of the display unit.

17. The vehicle control device of claim 16, wherein the processor is configured to:
determine that a preset user input is received, the preset user input associated with moving of the displayed position of the at least one graphic object; and
based on the determination that the preset user input is received, instruct the driving unit to bend the display unit at the position at which the at least one graphic object is displayed.

18. A vehicle comprising:
a plurality of wheels;
a power source configured to drive the plurality of wheels; and
the vehicle control device of claim 1.

19. A method of controlling a vehicle provided with a vehicle control device having a display unit, the method comprising:
sensing information associated with the vehicle;
bending at least a part of the display unit based on the sensed information associated with the vehicle;
determining that a driving mode of the vehicle is set to a preset driving mode;
based on the determination that the driving mode of the vehicle is set to the preset driving mode, instructing a driving unit to bend a preset part of the display unit; and
determining a bending degree of the preset part of the display unit in proportion to a speed of the vehicle based on the information associated with the vehicle.

* * * * *